(12) United States Patent
Kotaru et al.

(10) Patent No.: US 11,729,708 B2
(45) Date of Patent: Aug. 15, 2023

(54) AUTOMATED MATCHING OF APPLICATIONS TO PREDEFINED SLICE TYPES IN 5G NETWORKS

(71) Applicant: Microsoft Technology Licensing, LLC, Redmond, WA (US)

(72) Inventors: Manikanta Kotaru, Kenmore, WA (US); Landon Prentice Cox, Seattle, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 17/326,703

(22) Filed: May 21, 2021

(65) Prior Publication Data
US 2022/0377650 A1   Nov. 24, 2022

(51) Int. Cl.
*H04W 24/08* (2009.01)
*H04W 48/16* (2009.01)
(Continued)

(52) U.S. Cl.
CPC .......... *H04W 48/16* (2013.01); *H04W 24/08* (2013.01); *H04W 24/10* (2013.01);
(Continued)

(58) Field of Classification Search
CPC ..... H04W 48/16; H04W 24/08; H04W 24/10; H04W 28/0268; H04W 28/24; H04W 48/18
See application file for complete search history.

(56) References Cited

U.S. PATENT DOCUMENTS 10,708,368 B1\* 7/2020 Young ................... H04L 67/52
2019/0109768 A1\* 4/2019 Senarath ............... H04W 24/02
(Continued)

FOREIGN PATENT DOCUMENTS

GB         2574815 A      12/2019
WO  WO-2018175498 A1 \*  9/2018  ............ H04W 48/16
WO  WO-2020174482 A1 \*  9/2020  ............ H04W 24/02

OTHER PUBLICATIONS

"International Search Report and Written Opinion Issued in PCT Application No. PCT/US22/026621", dated Jul. 19, 2022, 13 Pages.

*Primary Examiner* — Julio R Perez
(74) *Attorney, Agent, or Firm* — Mark K. Young; Mayer & Williams, PC

(57) ABSTRACT

In a 5G network, a profiler component of a network slice controller is arranged to dynamically observe behaviors of pre-defined types of network slices when handling current traffic. The profiler employs the observed behaviors to generate profiles of the pre-defined slice types in terms of throughput, reliability, or other suitable metrics. In response to a request from an application for admission to the 5G network for which an ID of an appropriate pre-defined network slice type is unknown, the application request and traffic is handled on a slice which is temporarily utilized while the profiler dynamically observes application behaviors to generate an application profile. The profiler identifies a pre-defined slice type having a profile that is the closest match to the generated application profile. The application may then be moved from the temporary slice to a slice of the identified pre-defined type so that optimal slice characteristics are provided for the application's traffic.

20 Claims, 20 Drawing Sheets

(51) Int. Cl.
*H04W 24/10* (2009.01)
*H04W 28/02* (2009.01)
*H04W 28/24* (2009.01)
*H04W 48/18* (2009.01)

(52) U.S. Cl.
CPC ....... *H04W 28/0268* (2013.01); *H04W 28/24* (2013.01); *H04W 48/18* (2013.01)

(56) References Cited

U.S. PATENT DOCUMENTS

| | | |
|---|---|---|
| 2020/0059856 A1 | 2/2020 | Cui et al. |
| 2020/0120721 A1 | 4/2020 | Lau et al. |
| 2020/0366611 A1 | 11/2020 | Kommula et al. |
| 2022/0322211 A1* | 10/2022 | Maria ................ H04W 48/16 |

* cited by examiner

100

AUTOMATED MATCHING OF APPLICATIONS TO PREDEFINED SLICE TYPES IN 5G NETWORKS

BACKGROUND

Fifth generation (5G) mobile networks offer the ability to connect tens of billions of intelligent devices, densely deployed and generating orders of magnitude more data to be handled by the network. Consumers' expectations for 5G mobile networks are high and mobile network operators will be under real pressure from enterprise customers to move quickly, delivering 5G's low latency, dense device, and high-performance capabilities to enable near-real-time management and control of critical business operations.

SUMMARY

In a 5G network, a profiler component of a network slice controller is arranged to dynamically observe behaviors of pre-defined types of network slices when handling data traffic. The profiler employs the observed behaviors to generate profiles of the pre-defined slice types in terms of throughput, reliability, or other suitable metrics. In response to a request from an application for admission to the 5G network for which an ID (identification) of an appropriate pre-defined network slice type is unknown, application data is handled on a slice which is temporarily utilized while the profiler dynamically observes application behaviors to generate an application profile. The profiler identifies a pre-defined slice type having a profile that is the closest match to the generated application profile. The application may then be moved from the temporary slice to a slice with the identified pre-defined type so that slice characteristics and performance metrics are optimally matched to that of the application.

Advantageously, the profiler may operate to optimize access to the 5G network in cases in which applications do not know an appropriate pre-defined slice type. As 5G is currently a new technology, new devices, applications, and services are expected to rapidly proliferate as 5G infrastructure becomes more widely deployed and demands for 5G applications and services increase. The 5G environment includes a variety of pre-defined service types, having different characteristics, into which new applications may not necessarily fall neatly and new service types and sub-types are expected to become available in the future. Accordingly, it may be expected that some applications will not know an appropriate slice type ID to identify when requesting 5G network access.

Utilization of the inventive profiler can improve the technical operations of the physical infrastructure underlying a 5G network by efficiently matching application throughput and reliability characteristics to those provided by particular pre-defined slice types, dynamically in near-real-time, in response to ever-changing data traffic patterns and resource demands. The profiler, in operative combination with other 5G network components, enables operators and service providers to achieve reliable and performant connectivity among applications and services. Resources may be efficiently deployed by ensuring that pre-defined slice types are optimally configured and utilized to support new applications and services that are brought online into the 5G networking environment. The principles of the present invention may be applied to individual components of a 5G network including for example, radio access network (RAN), mobile core, and cloud, or be applied in view of end-to-end performance across the entire 5G network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

Figure 1:
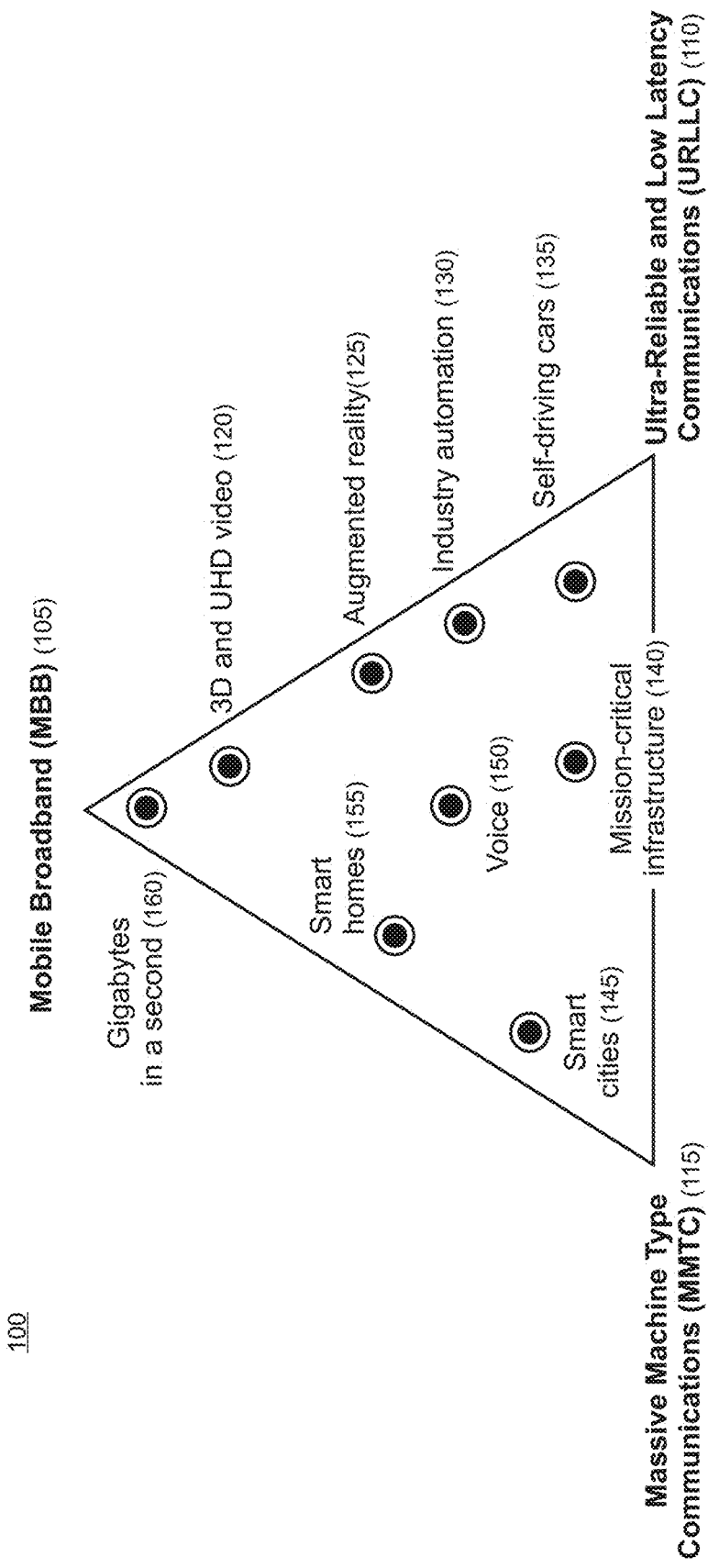
FIG. 1 shows illustrative 5G network usage scenario examples.

DETAILED DESCRIPTION 5G mobile networks utilize a service-based architecture that supports data connectivity and services enabling deployments using techniques such as, for example, Network Function Virtualization (NFV), Software Defined Networking (SDN), and cloud computing. Some exemplary features and concepts of 5G networking include separating User Plane (UP) functions from Control Plane (CP) functions allowing independent scalability, evolution, and flexible deployment across, for example, centralized locations and/or distributed (i.e., remote) locations. The functional design of 5G networks is modularized to enable flexible and efficient network slicing. Dependencies are also minimized between the Radio Access Network (RAN) and the Core Network (CN). The 5G architecture is thus defined with a converged core network with a common AN-CN interface which integrates different Access Types, for example 3GPP (3rd Generation Partnership Project) access and untrusted non-3GPP access such as WiMAX, cdma2000®, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 105; Ultra-Reliable and Low Latency Communications (URLLC) 110; and Massive Machine Type Communications (MMTC) 115, as shown in the usage scenario footprint 100 in FIG. 1.

The MBB usage scenario 105 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), very high traffic capacity is needed, while the requirement for mobility is typically low and user data rate is higher than that of wide-area coverage. For the wide-area coverage case, seamless coverage and medium to high mobility are desired, with much improved user data rate—20 Gbps for download and 10 Gbps for upload—compared to existing data rates. However, the data rate requirement may be relaxed compared to hotspot.

The URLLC usage scenario 110 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario may be characterized by a very large number of connected devices such as Internet of Things (IoT) devices with hundreds of thousands of connected devices per square kilometer. MMTC may also be referred to as "Massive IoT" (MIoT) in some 5G literature. Such connected devices can be expected to transmit a relatively low volume of non-delay sensitive data. Devices are typically required to be low cost and have a very long battery life.

Illustrative applications for 5G networking are also shown in FIG. 1. The applications can fall within the usage scenario examples 100 at different locations depending on a given balance of application networking requirements. As shown, the illustrative applications can include three-dimensional and/or ultra-high-definition (3D and UHD) 120; augmented reality 125; industry automation 130; self-driving cars 135; mission-critical infrastructure 140; smart cities 145; voice 150; smart homes 155; and gigabytes in a second 160.

It is emphasized that the ITU expects additional 5G usage scenarios and applications to emerge, and 5G network operators may not necessarily be limited to or required to support any particular usage scenarios or pre-defined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance and requirements of a particular service class or application that may meet some pre-defined service level agreement (SLA). Each portion of the 5G network is respectively sliced such that the network can be viewed as being composed of RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

Figure 2:
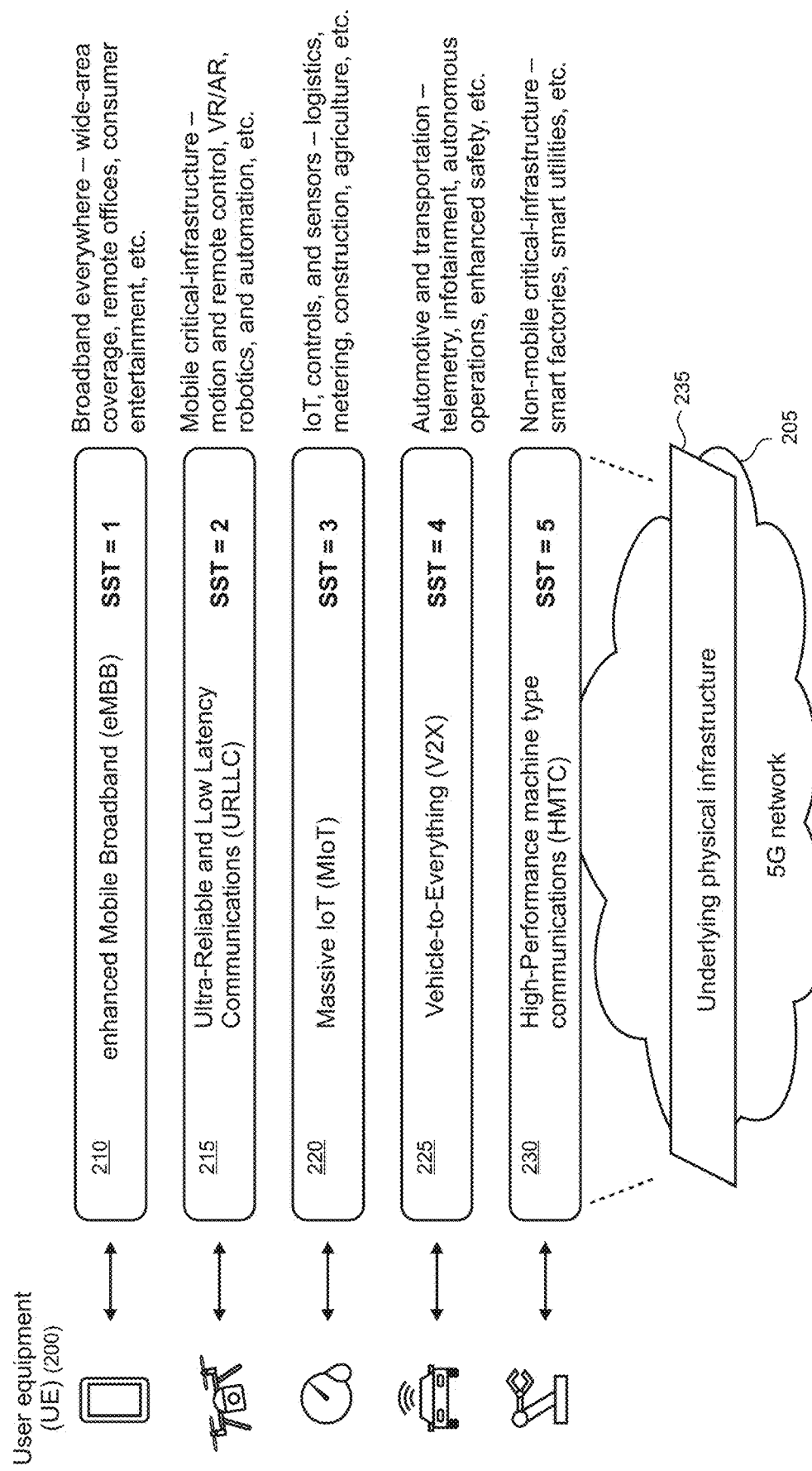
FIG. 2 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 2, the standardized 3GPP network slices of a 5G network 205 include eMBB (enhanced Mobile Broadband) (SST=1), URLLC (SST=2), and MIoT (SST=3) which correspond to the usage scenarios described by ITU-R 2083-0. Additional standardized SST values for V2X (Vehicle-to-Everything) (SST=4) and HMTC (High-Performance Machine Type Communications (SST=5) are also defined by 3GPP. It may be appreciated that slice service types beyond those having standardized SST values can be defined.

The five standardized or pre-defined service types for 5G network slices are respectively indicated by reference numerals 210, 215, 220, 225, and 230 in FIG. 2. IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer specific functionality. The 5G architecture enables different network configurations in different network slices.

A network slice can be dedicated to different types of services and span all the domains of the underlying physical infrastructure 235, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values and pre-defined slice types provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly used pre-defined Slice/Service Types. Additional customization and/or specialization for applications and services may be implemented for specific usage scenarios. A UE may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized pre-defined slice may also be supported by other pre-defined slices having other (i.e., non-standard) SST values.

FIG. 2 shows user equipment (UE) 200 that may be representative of the wide variety of device types that may utilize 5G networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration—i.e., how various physical infrastructure and network resources are deployed—to be rapidly and dynamically adapted to ensure that performance objectives are continuously met for 5G applications across a given population of UEs.

As shown, the configuration of eMBB slice 210 may be optimized for broadband-everywhere usage scenarios across a wide coverage area for applications such as consumer entertainment (e.g., video, gaming, streaming), remote offices, etc., where maximized network speeds and data rates are desired and high traffic volumes are typically experienced. The URLLC slice 215 may be configured for mobile critical-infrastructure low-latency usage scenarios including applications such as remote control operations in medical and industrial environments, VR and AR, robotics and automation, etc.

The MIoT slice 220 may be configured for optimal handling of IoT, control, and sensor applications relating to logistics, construction, and metering in vertical industries such as construction and agriculture. The V2X slice 225 may be optimized for automotive and transportation applications such as telemetry, infotainment, autonomous operations, enhanced safety, and the like. The HMTC slice 230 is typically configured for optimal handling of non-mobile/fixed critical-infrastructure applications such as smart factories, smart utilities, etc.

Figure 3:
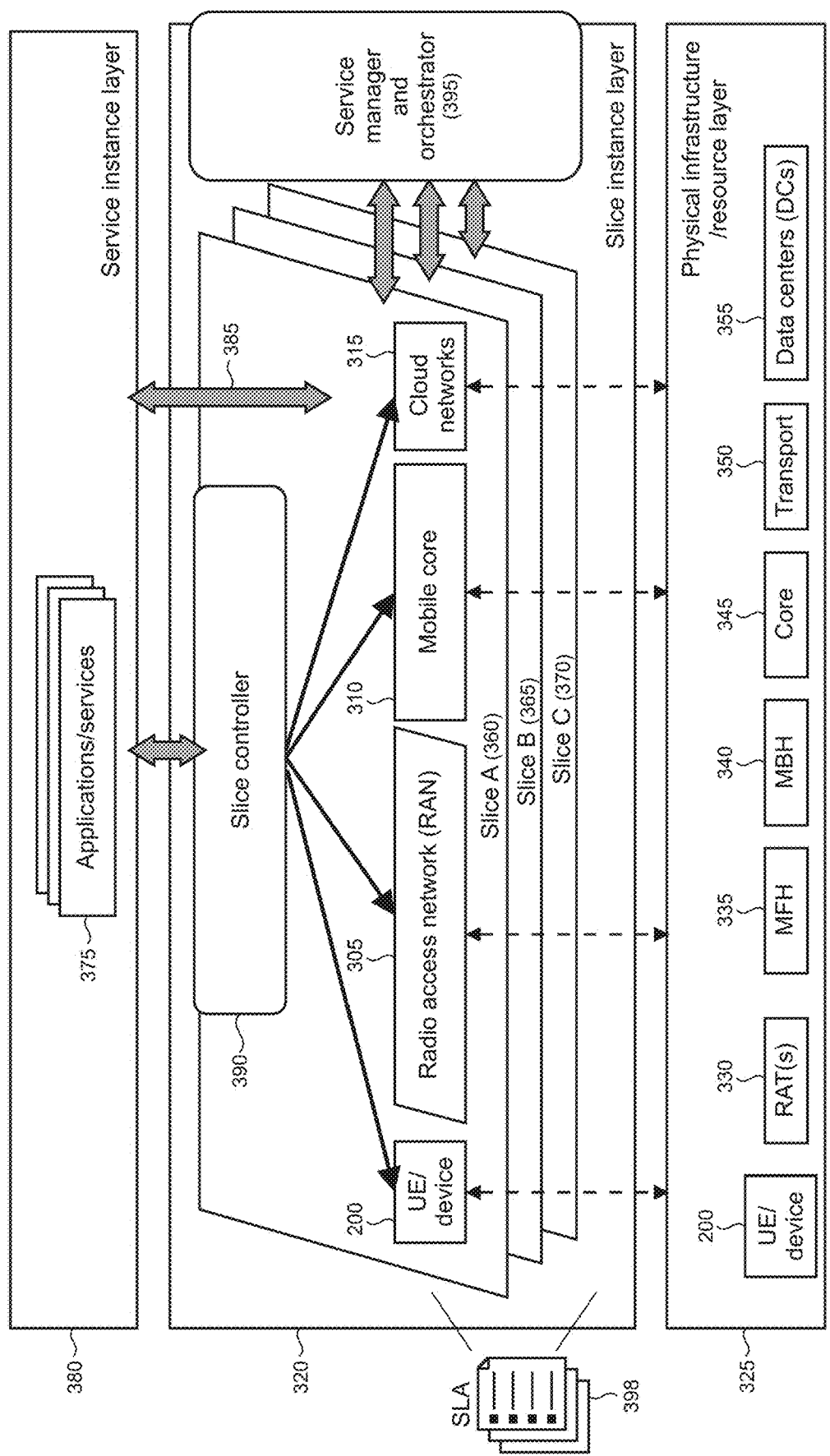
FIG. 3 shows an illustrative layered 5G network slicing framework.

FIG. 3 shows an illustrative layered 5G network slicing framework 300 that is described in the IMT-2020 recommendation. The framework comprises a RAN 305, mobile packet core 310, and cloud networking components 315 that are logically represented in a network slice instance layer 320 that sits above a physical infrastructure layer 325 in the framework. The physical infrastructure layer provides an abstraction of radio, compute, network, and storage resources which may include, for example, one or more RATs 330, mobile fronthaul (MFH) 335, mobile backhaul (MBH) 340, mobile core network 345, transport 350, and one or more datacenters (DCs) 355. In some cases, one or more UE instances may be implemented as resources.

In this illustrative example, the slice instance layer includes three 5G network slices—Slice A 360, Slice B 365, and Slice C 370, but more or fewer slices may be utilized in any given implementation at any given time. These slices may include one or more of the pre-defined slice types shown in FIG. 2 and described in the accompanying text or comprise different slice types.

Slices may be isolated by logically or physically isolating their underlying resources. The slices can support instances of various applications and/or services (collectively indicated by reference numeral 375) in a service instance layer 380, for example, using an application programming interface (API), as representatively indicated by reference numeral 385. Each network slice may be viewed as an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 390 is utilized with the slicing framework 300 to maintain awareness of the application requirements to responsively allocate and manage the virtualized network functions and resources in each slice. A service manager and orchestrator 395 combines the necessary resources and functions to produce a network slice instance. Its main tasks include creation of slice instances upon the underlying physical infrastructure, dynamically mapping network functions to slice instances to meet changing context and maintaining communication between the application and services and the framework to manage slice lifecycle.

As shown, a service level agreement (SLA) 398 is typically applicable to each of the slices 360, 365, and 370. The applicable SLAs can vary in scope and composition. The slice controller 390 may be advantageously utilized to perform resource allocation among RAN slices to meet the connectivity requirements while ensuring compliance with applicable SLA guarantees in some cases.

An SLA may be defined as a contract between the provider of a service and its internal or external end-user or customer that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality. Various types of customers can be supported by the present automated application matching methodologies, typically depending on applicable circumstances and context. For example, customers may include, but are not limited to consumers, businesses, enterprises, organizations, service providers, application developers, and the like. A 5G network operator may support its own services to customers as well as services from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while enhanced MBB resources may be readily scaled downward once the edge cloud buffering is complete.

Figure 4:
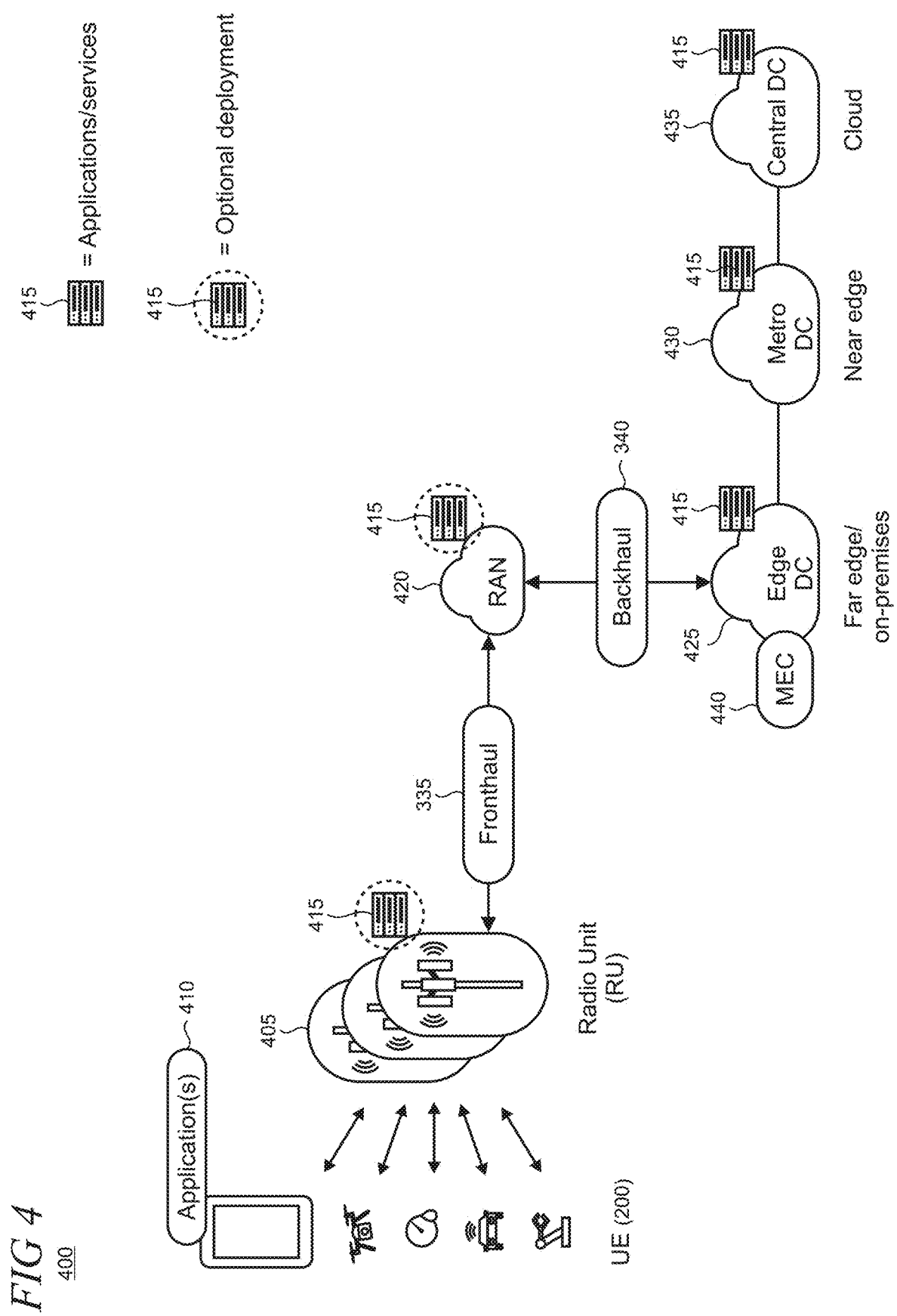
FIG. 4 shows illustrative physical infrastructure in a 5G network architecture.

FIG. 4 shows illustrative physical infrastructure in a 5G network architecture 400. Multiple instances of a radio unit (RU) 405 are configured to interact with a diverse population of UE 200. Each UE typically includes one or more local applications 410 or client-side software/firmware component that is arranged to interface with one or more remote application servers, service providers, or other resources (collectively indicated by reference numeral 415) and thus require network connectivity to such remote facilities.

The RUs are coupled by the mobile fronthaul 335 to a RAN 420. The RAN is coupled by the mobile backhaul 340 to one or more datacenters (DCs). In this illustrative example, the DCs comprise an edge DC 425, a metro DC 430, and a central DC 435. In some networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 440.

The application servers 415 can be located at various points in the network architecture 400 to meet technical requirements and traffic demands. Typically, the application servers will be physically located closer to the UE 200 in cases where latency is sought to be minimized. However, an operator's application server location criteria may also consider factors such as management ease, scalability, and security, among other factors. In some implementations, an operator may optionally deploy application servers and other resources in the RAN 420 or RU 405, as indicated by the dashed circles in FIG. 4.

Figure 5:
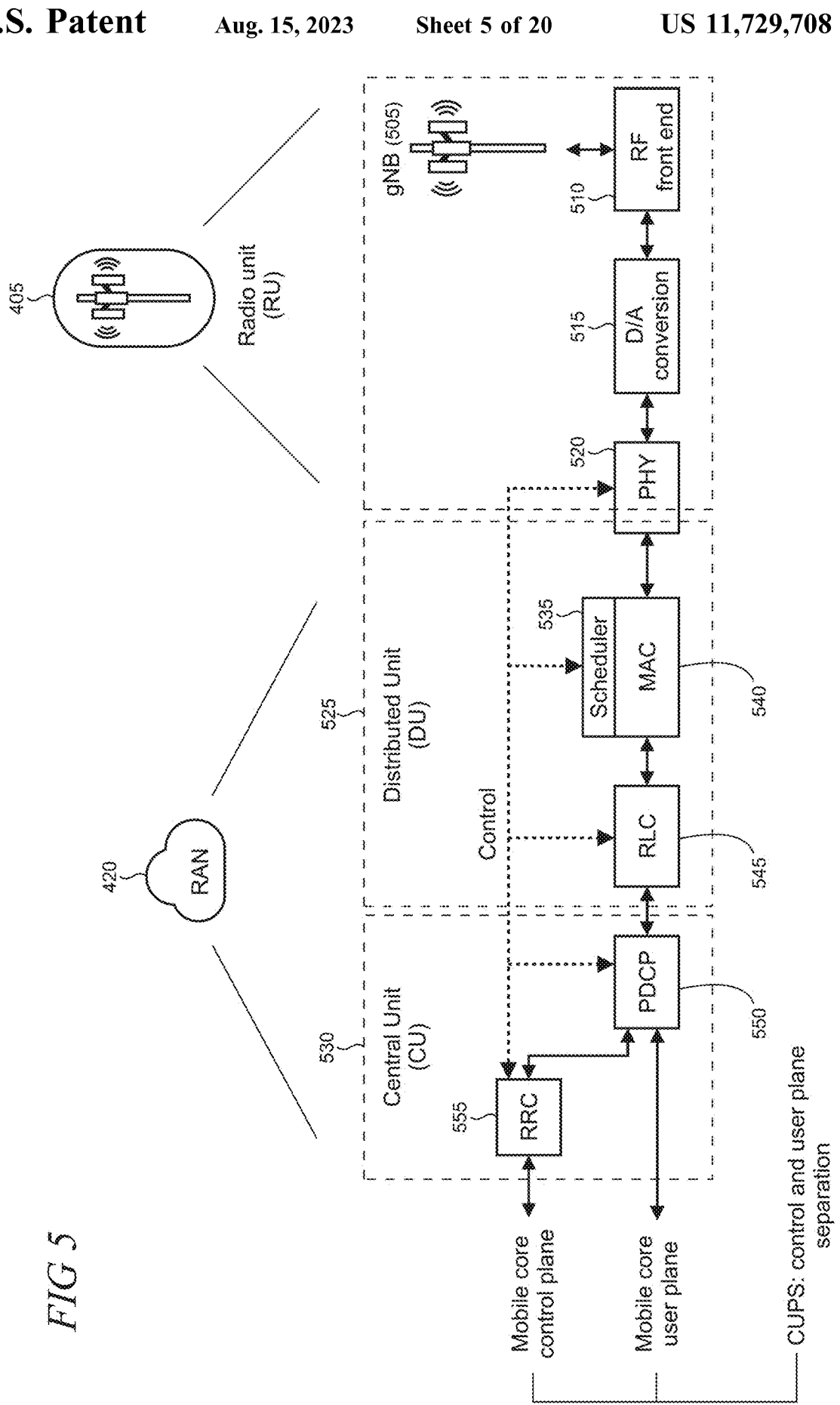
FIG. 5 shows an illustrative 5G radio access network (RAN) and radio unit (RU)

FIG. 5 shows functional blocks of the RAN 420 and RU 405. The RU comprises radio transmission points, for example, a next generation Node B, gNB 505, which handles radio communications with the UE. The gNB is serially coupled to a radio frequency (RF) front end 510, a digital to analog (D/A) conversion unit 515, and a portion of the functionality of the physical (PHY) layer 520 as described in the OSI Open Systems Interconnection model.

Under 3GPP and O-RAN (Open RAN) Alliance, the processing pipeline of the RAN 420 is split into a distributed unit (DU) 525, and a central unit (CU) 530. The DU is responsible for real-time layers 1 and 2 (L1 and L2) scheduling functions, and the CU is responsible for non-real-time, higher L2 and L3 functions. Accordingly, the DU comprises a scheduler 535 located on top of a MAC (Medium Access Control) layer component 540, an RLC (radio link control) layer component 545, and parts of a PHY (physical) layer component 520. The MAC layer component is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 530 is configured with a PDCP (Packet Data Convergence Protocol) layer component 550 and RRC (Radio Resource Control) layer component 555. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the mobile core control plane while the PDCP layer component interfaces with the user plane to thereby implement the "CUPS" feature of 5G (control and user plane separation).

Figure 6:
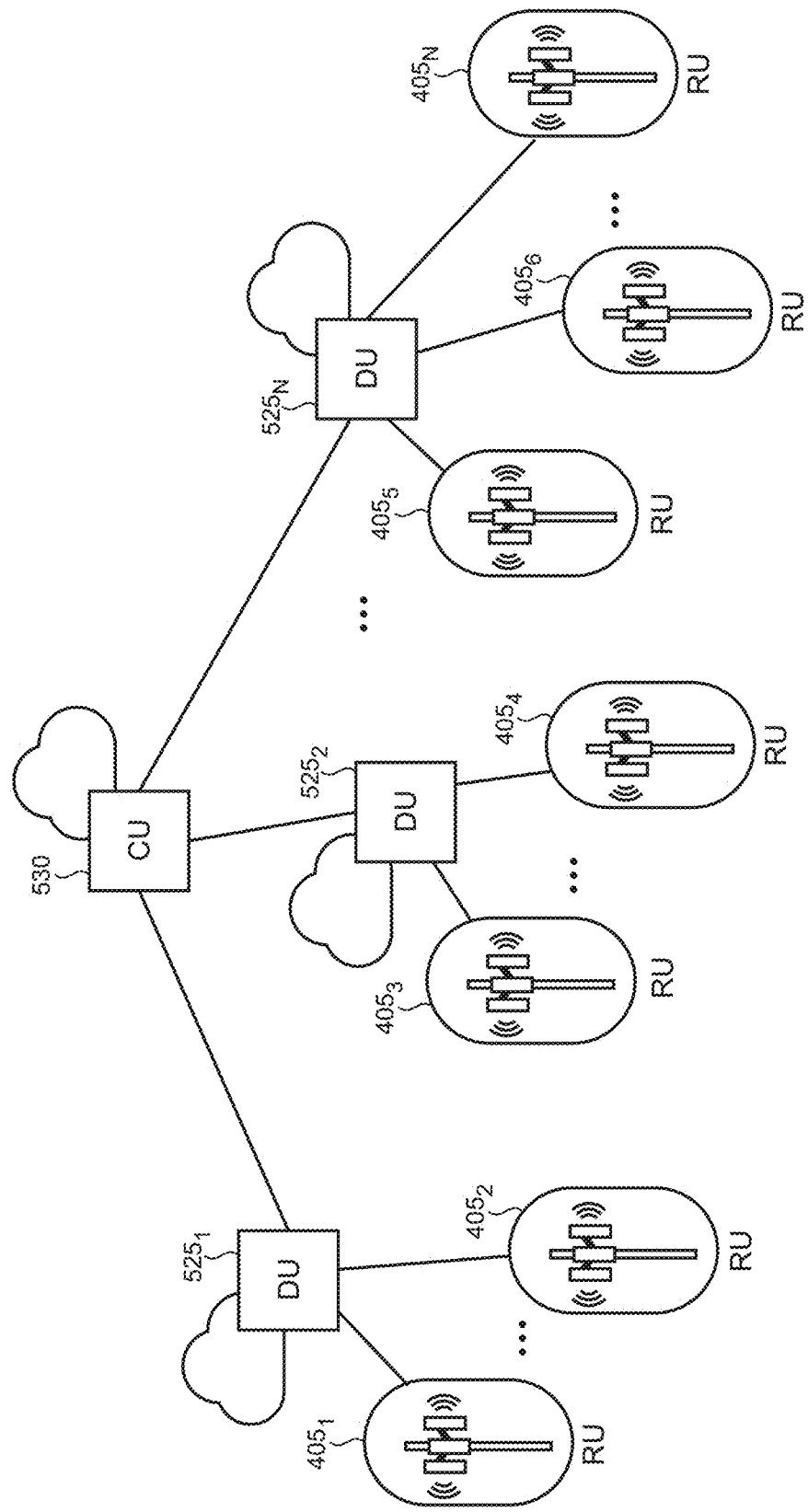
FIG. 6 shows an illustrative split-RAN hierarchy in which a central unit (CU) may support multiple distributed units (DUs) which, in turn, may support multiple RUs.

The split-RAN configuration shown in FIG. 5 enables RAN functionality to be split among physical infrastructure elements in centralized and distributed locations. For example, as shown in FIG. 6, a single CU 530 may be configured to serve multiple DUs 525, each of which in turn serves multiple RUs 405.

Figure 7:
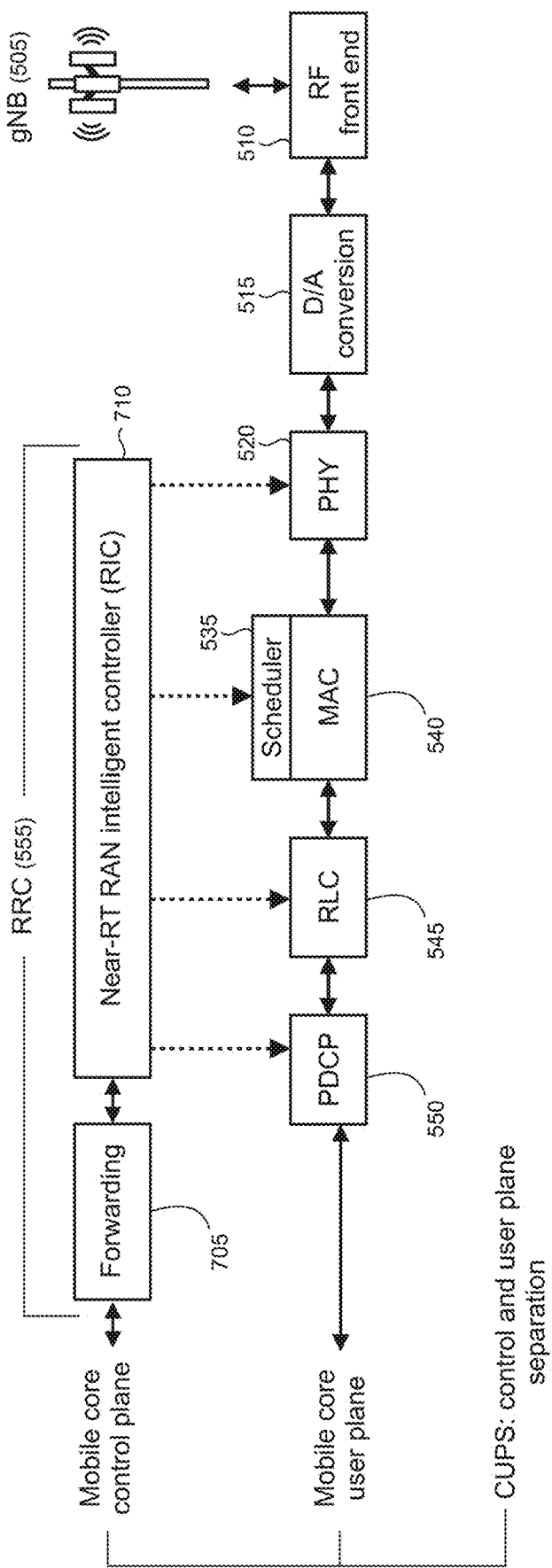
FIG. 7 shows an illustrative radio resource control (RRC) that is disaggregated into a mobile core-facing control plane component and a near-real-time RAN intelligent controller (near-RT MC)

FIG. 7 shows that the RRC layer component 555 may be disaggregated into a mobile core-facing control plane forwarding component 705 and a near-real-time (RT) controller RAN intelligent controller (MC) 710. The RRC layer component is thus responsible for only near-real-time configuration and control decision making, while the scheduler 535 on the MAC component 540 is responsible for real-time scheduling decisions.

Figure 8:
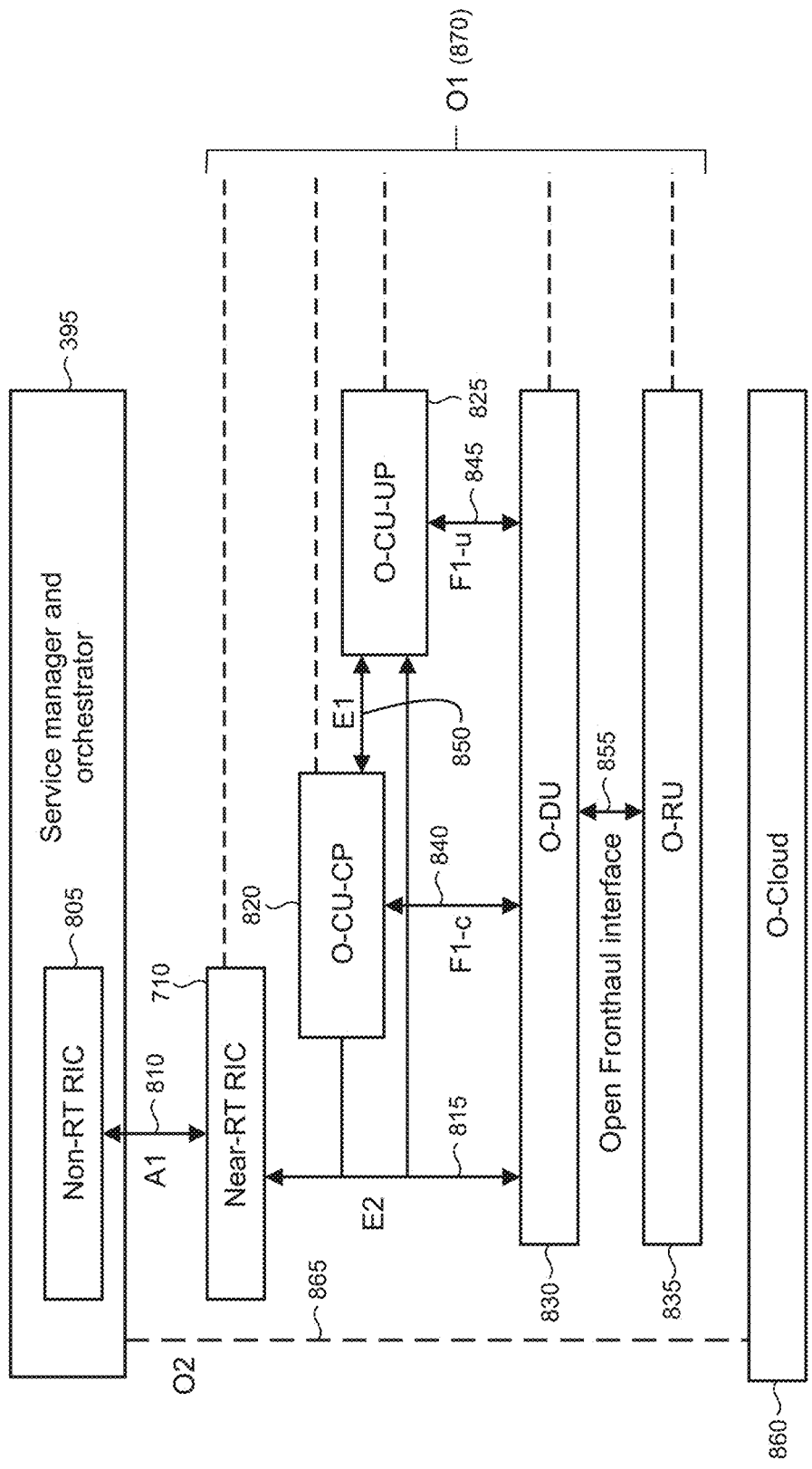
FIG. 8 shows an illustrative RAN operations and maintenance (OAM) logical architecture as described by the O-RAN Alliance.

FIG. 8 shows an illustrative RAN operations and maintenance (OAM) logical architecture 800, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 805 may be incorporated into the service manager and orchestrator 395. The non-RT RIC interoperates with a near-RT MC 710 through an A1 interface 810.

The near-RT MC 710 is coupled over an E2 interface 815 with network functions for radio access for control and optimization including the O-CU-CP (O-RAN Central Unit-Control Plane) 820, O-CU-UP (O-RAN Central Unit-User Plane) 825, and O-DU 830. The O-CU-CP and O-CU-UP are respectively coupled to the O-DU over F1-c and F1-u interfaces, 840 and 845, as defined and maintained by 3GPP. The O-CU-CP is coupled to the O-CU-UP over a 3GPP E1 interface 850. The O-DU and O-RU 835 are coupled using an Open Fronthaul interface 855 (also known as the lower layer split (LLS) interface).

The O-Cloud 860 is a cloud computing platform comprising a collection of physical infrastructure nodes that meet O-RAN requirements to host the relevant O-RAN functions (i.e., near-RT MC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 395 over the O2 interface 865. An O1 interface 870 is provided to each of the near-RT RIC, O-CU-CP, O-CU-UP, O-DU, and O-RU, as shown in FIG. 8.

Figure 9:
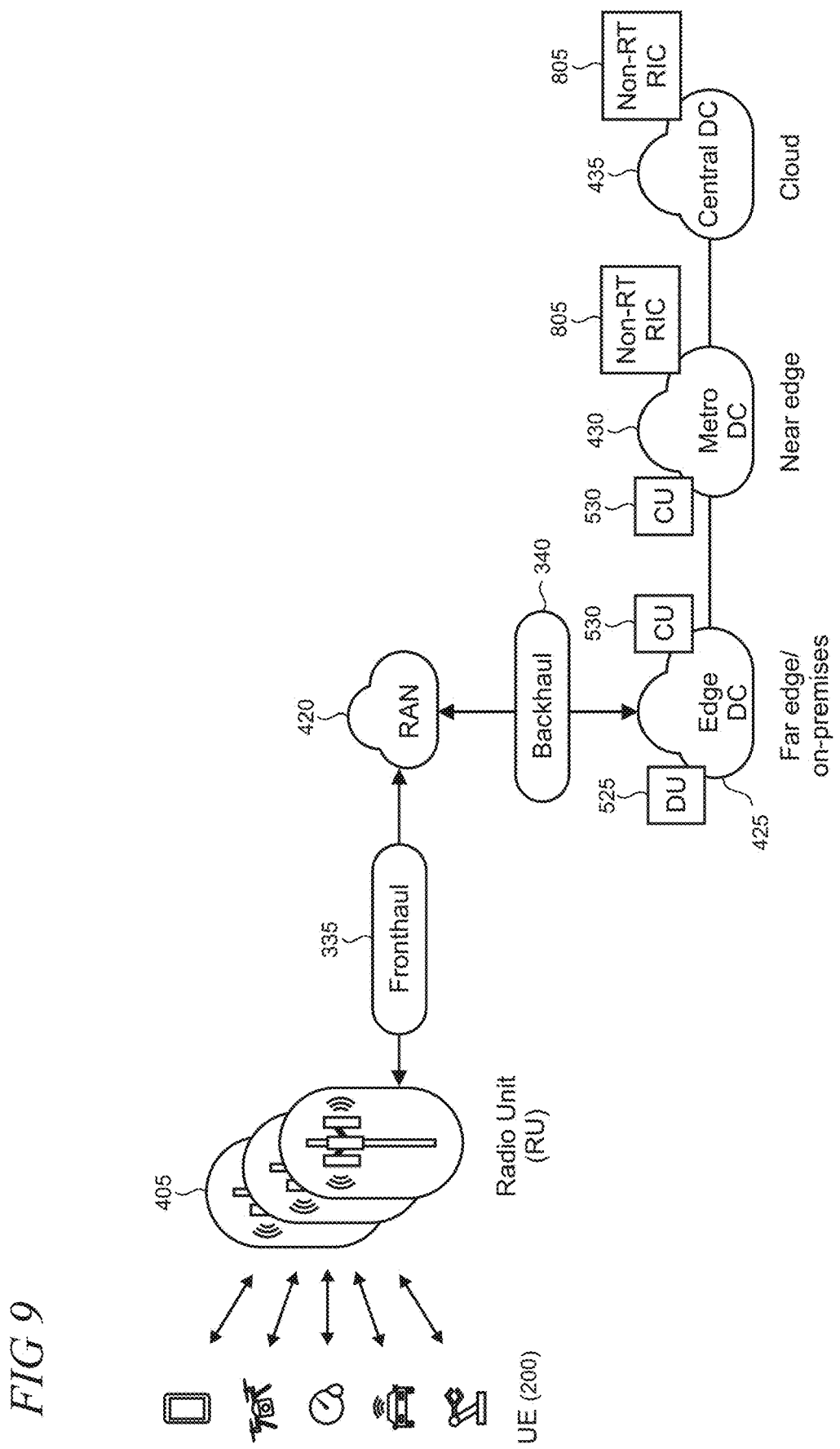
FIG. 9 shows an illustrative 5G implementation in which split-RAN functional units and instances of the non-real-time RIC (non-RT RIC) may be distributed among physical infrastructure components.

The splitting of functional elements among the DU, CU, near-RT MC, and non-RT MC, as discussed above, enables flexible deployment of instances of such elements in the physical infrastructure that underlies a typical 5G network. FIG. 9 shows an illustrative 5G implementation in which split-RAN functional units and instances of the non-RT MC may be distributed among physical infrastructure components. For example, as shown, a DU 525 and CU 530 may be located at the edge DC 425. A CU 530 and non-RT RIC 805 may be located in the metro DC 430. The central DC 435 can also host a non-RT MC in some cases.

Figure 10:
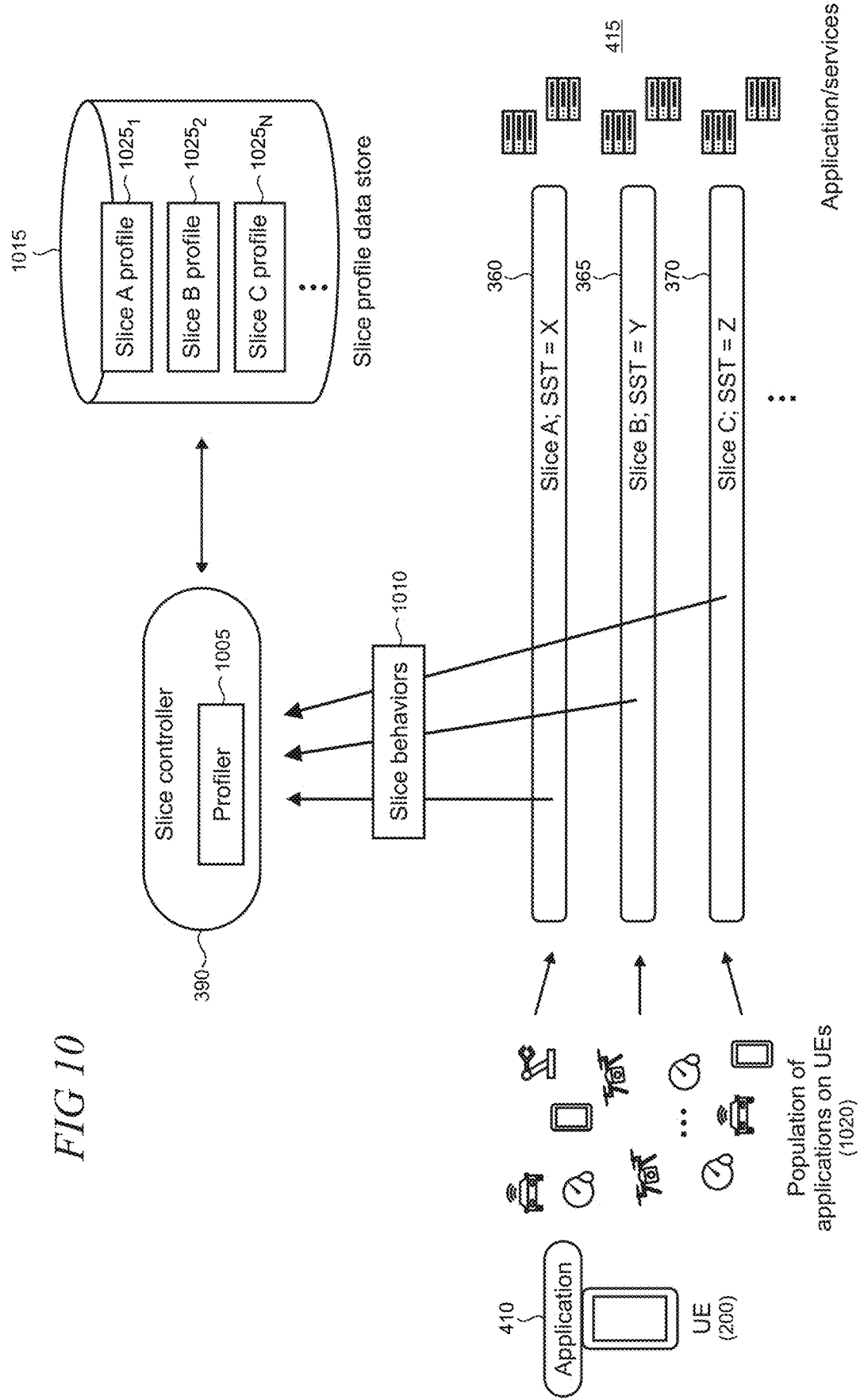
FIG. 10 shows an illustrative profiler that may be configured to observe slice behaviors to generate slice profiles.

FIG. 10 shows an illustrative profiler 1005 that may be configured to observe behaviors 1010 of slices 360, 365, and 370 when carrying traffic in the 5G network to generate network slice profiles in a data store 1015. The slices include different pre-defined slice types in this illustrative example. The profiler may be implemented, for example, as a component that is integrated or combined with the slice controller 390 (FIG. 3), the near-RT MC 710 (FIG. 7), the non-RT MC 805 (FIG. 8), or be distributed across such components or other components in the 5G network. The choice of profiler implementation will typically depend on requirements of a specific application of the present automated matching of applications to pre-defined slice types.

Slice behaviors 1010 are observed when handling across data traffic that is aggregated from a population 1020 of applications executing on the UE 200 using a suitable monitoring functionalities on each of the slices. The profiler 1005 analyzes the observations to generate and store individual slice profiles 1025 that characterize performance of the respective slice. In some applications, the slice profiles may be associated with specific portions of the 5G network (e.g., RAN, mobile core, cloud etc.), or the profiles can characterize end-to-end performance of the 5G network. In this illustrative example the profiles describe characteristics of RAN slices that have different pre-defined types.

As the network slices 360, 365, and 370 are virtualized, the observations of slice behaviors in handling application data may be implemented using virtual monitoring components that are located at suitable points within the NFV and SDN environments to perform the monitoring to gain the required visibility. For example, the profiler 1005 may receive near-real-time RAN performance measurements from slices over the E2 interface 815 shown in FIG. 8 and described in the accompanying text. Such monitoring functionalities may also be partially or fully implemented using physical infrastructure in some cases.

Figure 11:
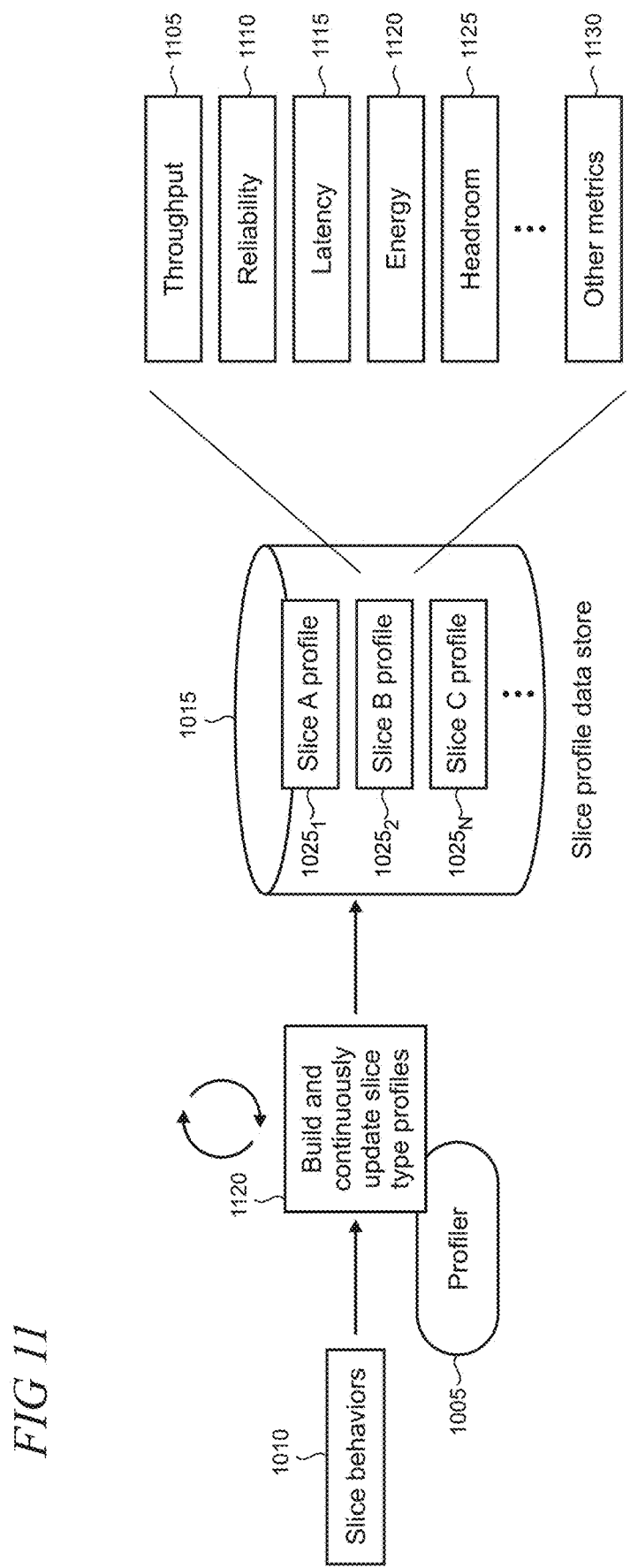
FIG. 11 shows illustrative slice profiles that are defined in terms of throughput, reliability, and/or other metrics.

As illustratively shown in FIG. 11, the network slice profiles may be defined or characterized in terms of one or more of throughput 1105 (e.g., data transfer rate), reliability 1110 (e.g., bit/packet error rate), latency 1115, energy efficiency 1120, headroom 1125 (i.e., the ability of a slice to support additional applications/data traffic), and/or other metrics 1130 that may be suitable for a particular implementation of the present invention. In this illustrative example, the profiler 1005 is configured to use the observed slice behaviors 1010 over one or more pre-defined time intervals to build and update slice profiles, as indicated by reference numeral 1120. The slice profiles may be dynamically and continuously updated in view of changing 5G network conditions and slice behaviors so that each reflects a current slice state at any given time instance.

Figure 12:
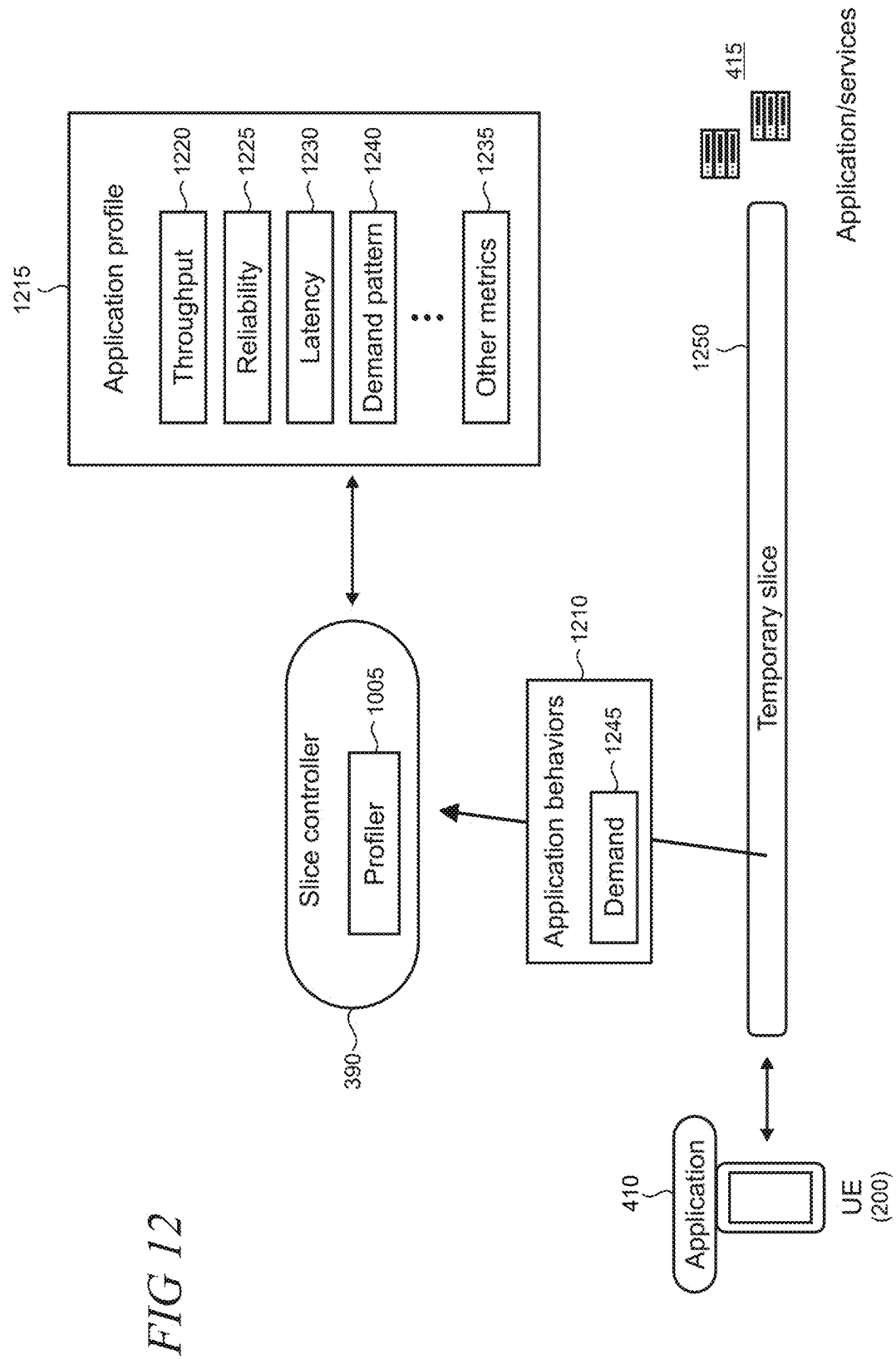
FIG. 12 shows an illustrative profiler that may be configured to observe behaviors of an application to generate an application profile that is defined in terms of throughput, reliability, and/or other metrics.

As illustratively shown in FIG. 12, the profiler 1005 may be configured to observe behaviors 1210 of an application 410 executing on a UE 200 to generate an application profile 1215 that is defined in terms of throughput 1220, reliability 1225, latency 1230, and/or other suitable metrics 1235. The profiler can observe application behaviors by employing a suitable monitoring functionality on a network slice 1250 that is provided for use on a temporary basis for the application.

In some applications of the present invention, data traffic demands of the application 410 may also be included as a component of the application profile 1215. The profiler 1005 can generate a demand pattern profile 1240, for example, based on observations of demand characteristics 1245 of the application while using the temporary slice 1250. Alternatively, the profiler, or a separate demand profiling component, can generate a demand profile for the application based on observations of past traffic demands on the network and/or using suitable predictive techniques. Different UE/application types engaging in different usage scenarios may typically be expected to have varying demand profiles. However, demand variability may also be observed among instances of similar applications and UE in some cases.

The access to the temporary network slice 1250 may be provided in response to an admission request in situations, for example, where the application does not know, is unaware, or is otherwise unable to identify an ID (identification) of a specific slice. In some cases, the temporary slice will have a level of service that is specified in an applicable SLA, or some minimum level of service. While in other cases services on the temporary slice are provided with a "best effort" guarantee, or no guarantee. The application profile generated by the profiler 1005 may be matched to the closest slice type profile so that an appropriate slice type can be selected and utilized for the 5G network to meet application requirements in an optimal manner.

Figure 13:
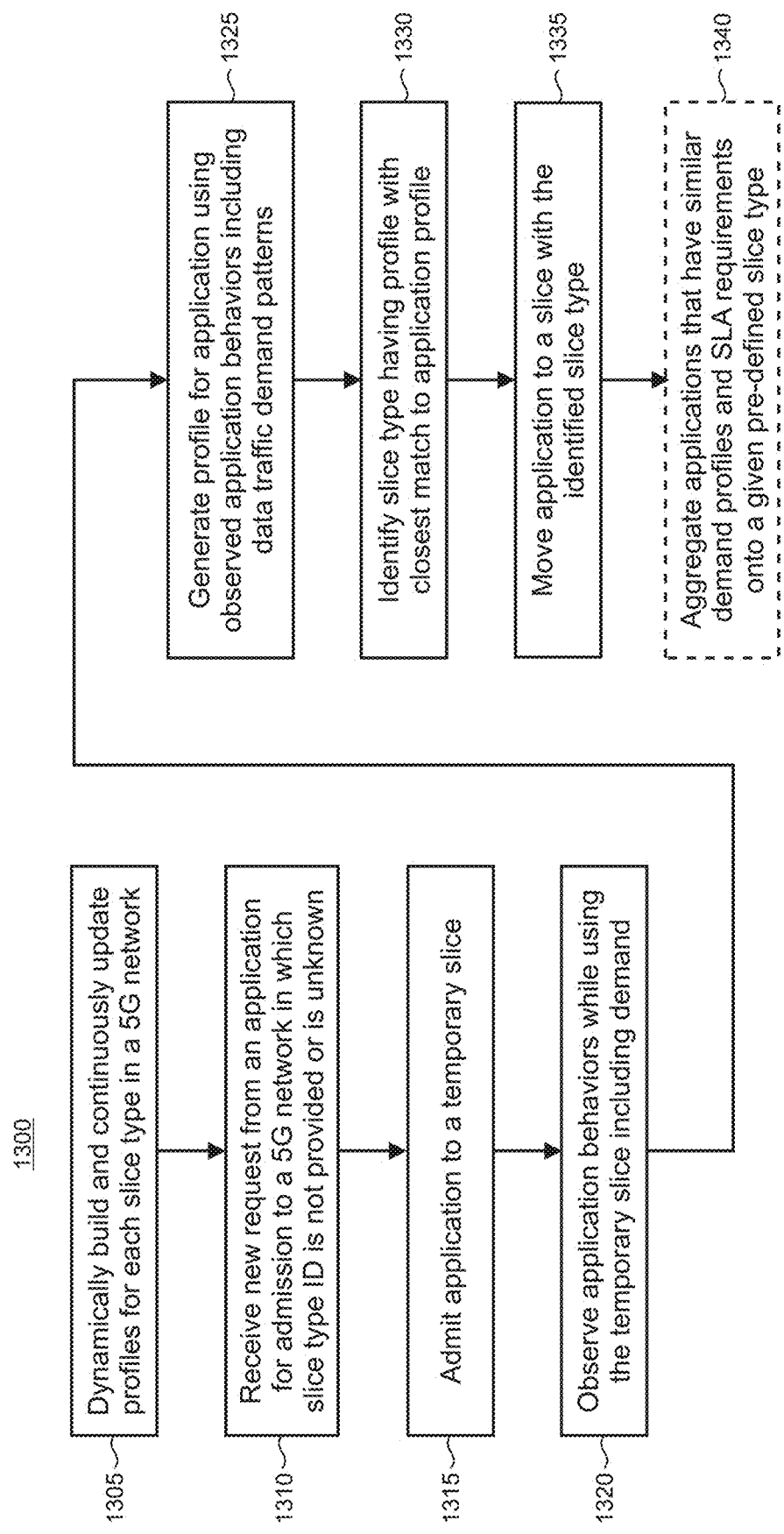
FIG. 13 is a flowchart of an illustrative method by which a request from an application, that does not provide or know a slice ID (identification), is matched to a pre-defined slice type having a profile that is closest to the profile of the application.

A flowchart of the overall admission process is shown in the flowchart 1300 of FIG. 13. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At block 1305, the profiler 1005 (FIG. 10) can dynamically build and continuously update profiles for different pre-defined network slice types in the 5G network. Each pre-defined slice type can include multiple slice instances and both standardized and non-standardized pre-defined slice types may be utilized. In some implementations of 5G networks, instances of slices of various types may be put up and taken down from time to time to meet changing traffic requirements and service demands. As network slices of various types come online, the profiler can build an initial profile and then update the profile as slice behaviors are observed over time.

At block 1310, a request for admission to the 5G network is received from an application (e.g., application 410 on UE 200 shown in FIG. 12). The application may be unknown or new to the network in some cases, or the request for admission may be associated with a new session, for example, in other cases. In either case, the application may not know an ID of a suitable network slice, or does not provide the ID. Under 3GPP TS 23.501, each network slice type is uniquely identified by an NSSAI (Network Slice Selection Assistance Information) or one or more S-NSSAI (single NSSAI) in cases where an optional SD is utilized for non-standardized slices.

At block 1315, the application is admitted to the temporary slice 1250 (FIG. 12). Admission mechanics and/or procedures may be handled, for example, by the profiler 1005 (FIG. 10), the slice controller 390 (FIG. 3), or some other suitable component that is typically instantiated in the RAN OAM 800 (FIG. 8). At block 1320, behaviors of the application are observed by the profiler, including the demand characteristics, while the application is supported on the temporary slice.

At block 1325, the profiler can generate a profile for the application using the observed application behaviors including the application's demand patterns. In typical implementations, as noted above, the application profile is generally defined in terms of throughput and reliability over time although other metrics can also be utilized. At block 1330, the profiler identifies a slice type having a profile that is closest to the profile that was generated for the application. The degree to which the profiles can be different but still be considered a match can vary by implementation. At block 1335, the application is moved from the temporary slice to a slice having the identified slice type so that the application traffic is optimally matched to characteristics of the new slice.

Block 1340 may be optionally or alternatively utilized. In such cases, the slice controller can aggregate applications that have similar demand profiles onto a given slice without necessarily considering slice channel qualities. For example, such an application and slice matching strategy may provide satisfactory results so long as application demand patterns and SLA requirements are similar. It may be appreciated that a combination of channel characteristics and demand characteristics may be utilized to match applications to particular pre-defined slice types in a 5G network as may be required to meet the needs of a particular implementation.

Figure 14:
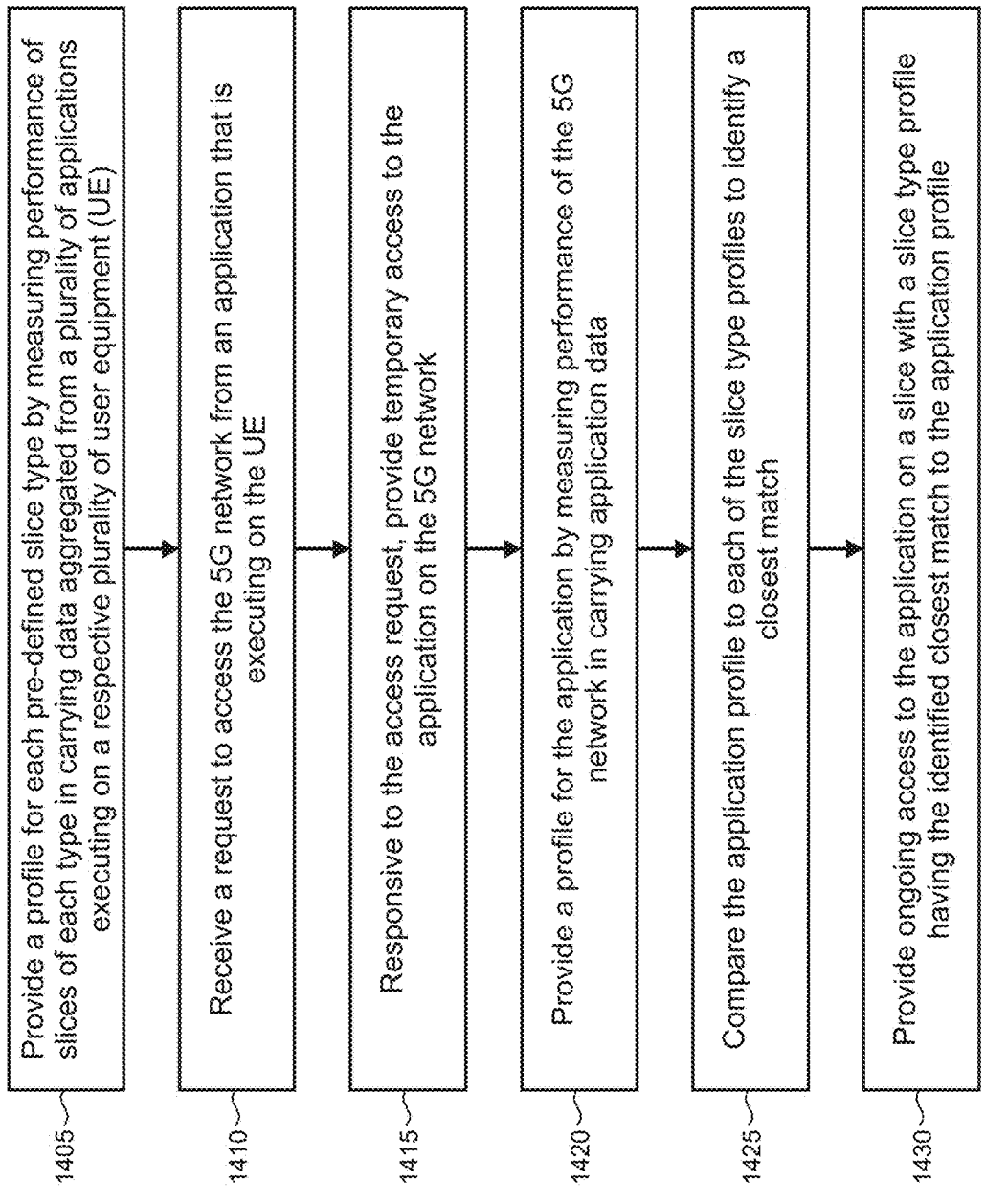
FIGS. 14, 15, and 16 show illustrative methods that may be performed when implementing the present automated matching of applications to pre-defined slice types in 5G networks.

FIG. 14 is a flowchart of an illustrative method 1400 that may be performed for matching applications to different pre-defined slice types in a 5G network. At block 1405, a profile is provided for each pre-defined slice type by measuring performance of slices of each type in carrying data traffic aggregated from a plurality of applications executing on a respective plurality of UE. At block 1410, a request to access the 5G network is received from an application that is executing on the UE. At block 1415, responsive to the access request, temporary access is provided to the application on the 5G network.

At block 1420, a profile is provided for the application making the access request by measuring performance of the 5G network in carrying application data. At block 1425, the application profile is compared to each of the slice type profiles to identify a closest match. At block 1430, ongoing access is provided to the application on a slice with a slice type profile having the identified closest match to the application profile.

Figure 15:
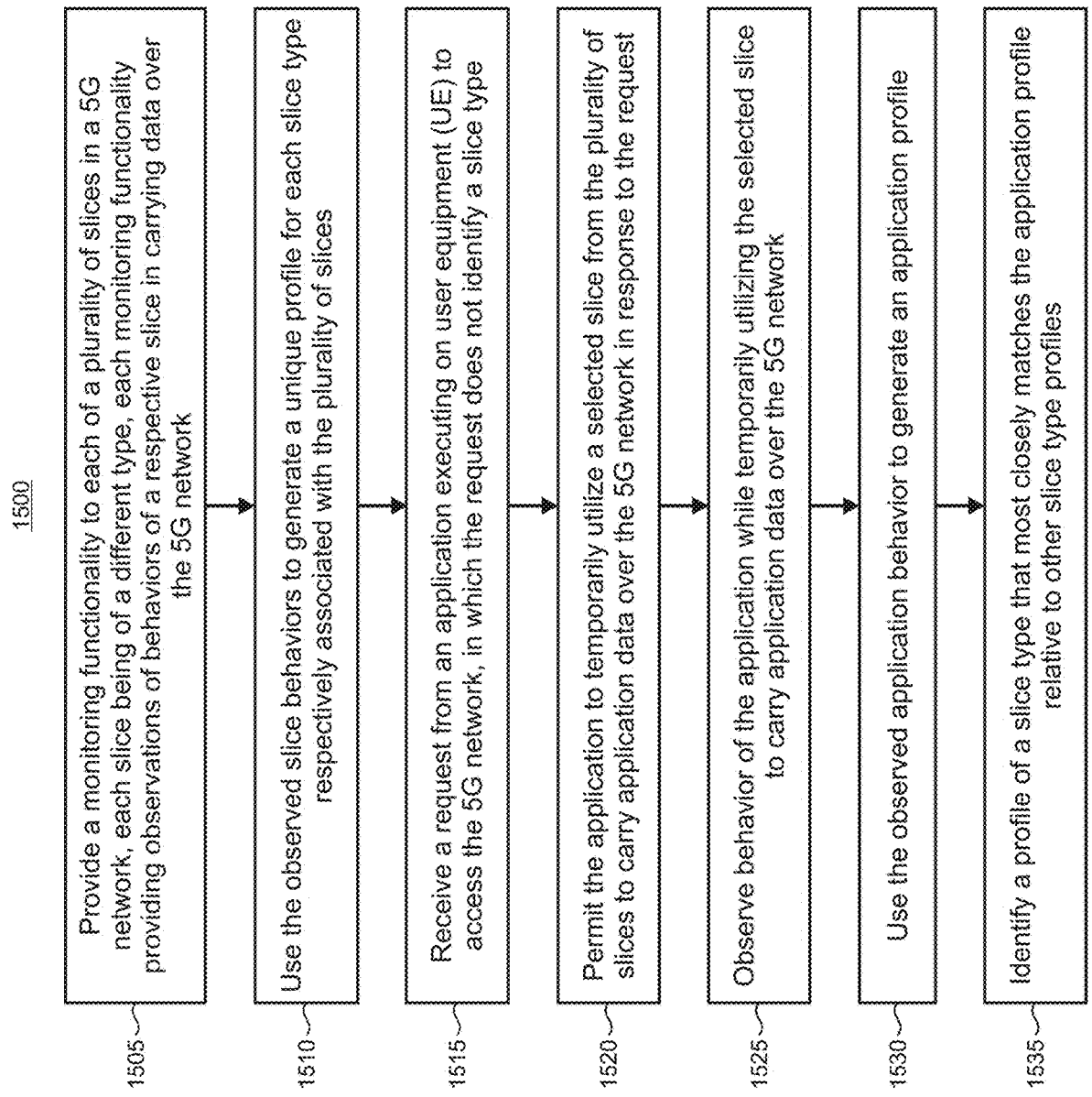

FIG. 15 is a flowchart of another illustrative method 1500 that may be performed in a 5G network. At block 1505, a monitoring functionality is provided to each of a plurality of slices in a 5G network in which each slice is a different type, and each monitoring functionality provides observations of behaviors of a respective slice in carrying data over the 5G network. At block 1510, the observed slice behaviors are used to generate a unique profile for each slice type respectively associated with the plurality of slices.

At block 1515, a request is received from an application executing on UE to access the 5G network, in which the request does not identify a slice type. At block 1520, the application is permitted to temporarily utilize a selected slice from the plurality of slices to carry application data over the 5G network in response to the request. At block 1525, behavior of the application while temporarily utilizing the selected slice to carry application data over the 5G network is observed.

At block 1530, the observed application behavior is used to generate an application profile. At block 1535, a profile of a slice type is identified that most closely matches the application profile relative to other slice type profiles.

Figure 16:
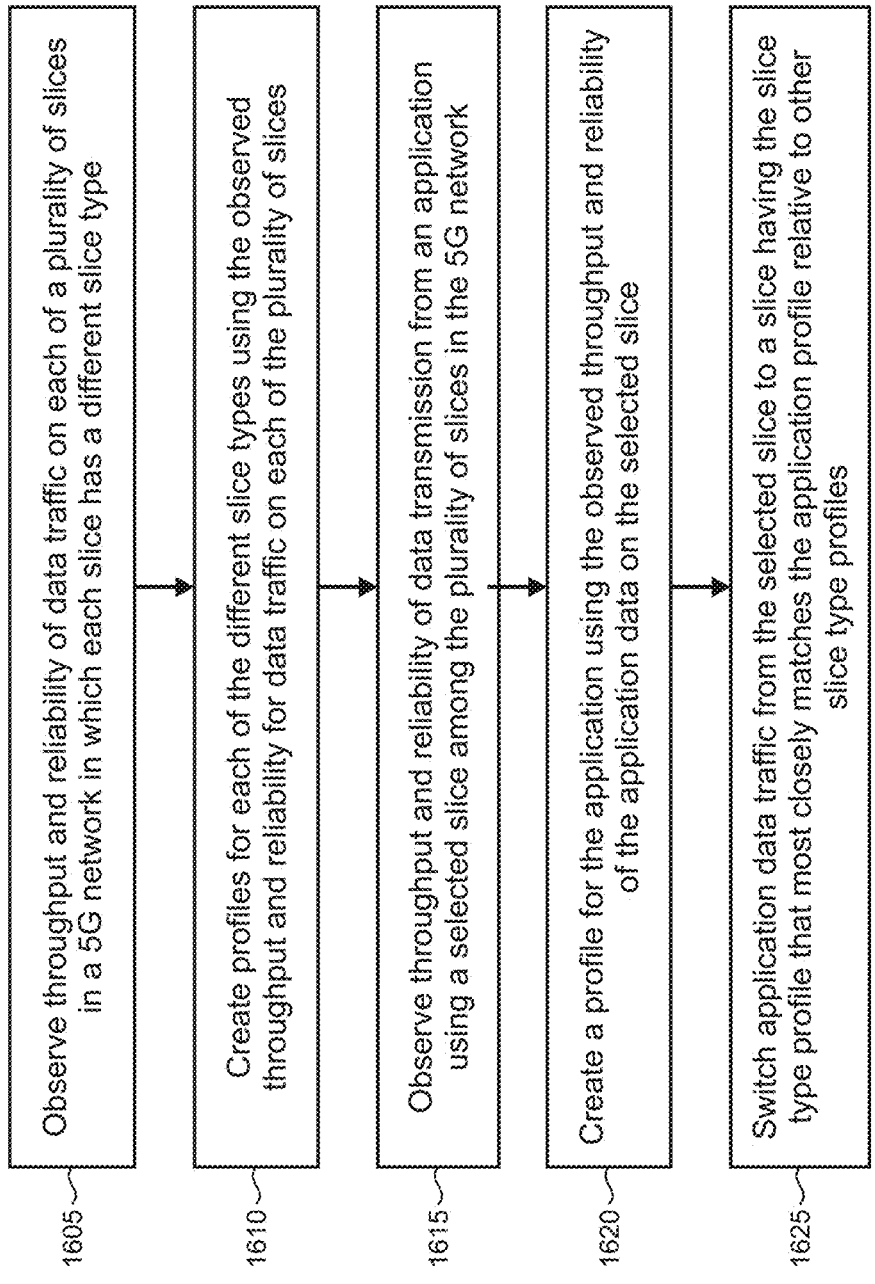

FIG. 16 is a flowchart of another illustrative method 1600 that may be performed in a 5G network. At block 1605, one or more of throughput, latency, or reliability of data traffic are observed on each of a plurality of slices in a 5G network in which each slice has a different slice type. At block 1610, profiles are created for each of the different slice types using the observations for data traffic on each of the plurality of slices.

At block 1615, one or more of throughput, latency, or reliability of data traffic from an application using a selected slice among the plurality of slices in the 5G network are observed. At block 1620, a profile is created for the application using the observations of the application data traffic on the selected slice. At block 1625, application data traffic is switched from the selected slice to a slice having the slice type profile that most closely matches the application profile relative to other slice type profiles.

Figure 17:
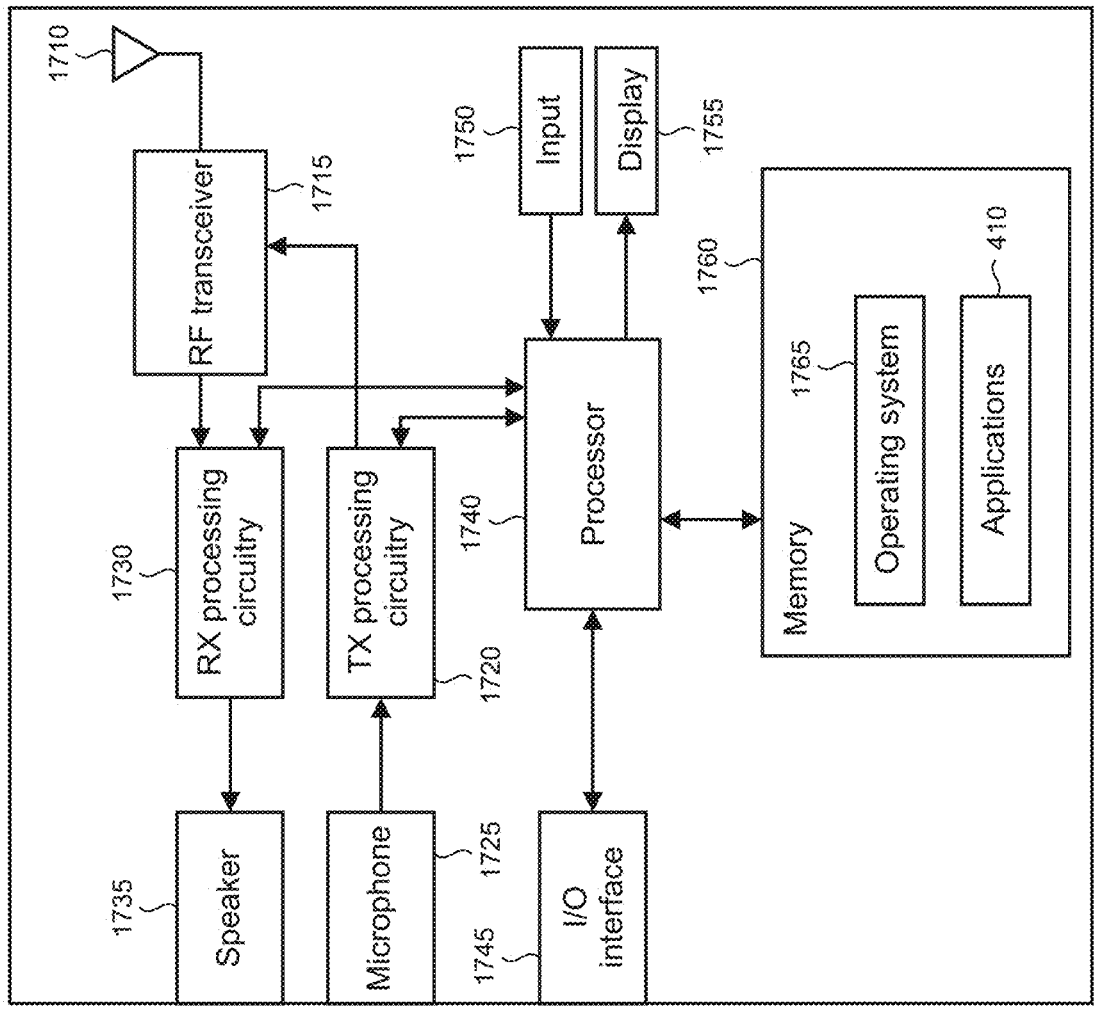
FIG. 17 is a block diagram of an illustrative UE that may be used at least in part to implement the present automated matching of applications to pre-defined slice types in 5G networks.

FIG. 17 is a block diagram of an illustrative UE 200 that may be used at least in part to implement the present automated matching of applications to pre-defined slice types in 5G networks. The embodiment of the UE 200 shown in FIG. 17 is for illustration only, and the UEs 200 shown in the drawings and described in the preceding text may have the same or similar configuration. However, it is noted that UEs may come in a wide variety of configurations, and FIG. 17 does not limit the scope of the present disclosure to any particular implementation of a UE.

The UE 200 includes an antenna 1710, a radio frequency (RF) transceiver 1715, transmit (TX) processing circuitry 1720, a microphone 1725, and receive (RX) processing circuitry 1730. The UE 200 also includes a speaker 1735, a processor 1740, an input/output (I/O) interface 1745, an input device 1750, a display 1755, and a memory 1760. The memory includes an operating system (OS) program 1765 and one or more applications 410.

The RF transceiver 1715 receives from the antenna 1710, an incoming RF signal transmitted by a gNB of a 5G network 400 (FIG. 4). The RF transceiver down-converts the incoming RF signal to generate an intermediate frequency (IF) or baseband signal. The IF or baseband signal is sent to the RX processing circuitry 1730, which generates a processed baseband signal by filtering, decoding, and/or digitizing the baseband or IF signal. The RX processing circuitry transmits the processed baseband signal to the speaker 1735 (such as for voice data) or to the processor 1740 for further processing (such as for web browsing data).

The TX processing circuitry 1720 receives analog or digital voice data from the microphone 1725 or other outgoing baseband data (such as web data, e-mail, or interactive video game data) from the processor 1740. The TX processing circuitry 1720 encodes, multiplexes, and/or digitizes the outgoing baseband data to generate a processed baseband or IF signal. The RF transceiver 1715 receives the outgoing processed baseband or IF signal from the TX processing circuitry and up-converts the baseband or IF signal to an RF signal that is transmitted via the antenna.

The processor 1740 can include one or more processors or other processing devices and execute the OS program 1765 stored in the memory 1760 to control the overall operation of the UE 200. For example, the processor may control the reception of forward channel signals and the transmission of reverse channel signals by the RF transceiver 1715, the RX processing circuitry 1730, and the TX processing circuitry 1720 in accordance with well-known principles. In some embodiments, the processor 1740 includes at least one microprocessor or microcontroller.

The processor 1740 may be configured for executing other processes and programs resident in the memory 1760, such as operations for CSI measurement and reporting for systems described in embodiments of the present disclosure. The processor can move data into or out of the memory as required by an executing process. In some embodiments, the processor may be configured to execute the applications 410 based on the OS program 1765 or in response to signals received from gNBs or an operator. The processor is also coupled to the I/O interface 1745, which provides the UE 200 with the ability to connect to other computing devices such as laptop computers and handheld computers. The I/O interface may thus function as a communication path between such accessories and the processor.

The processor 1740 is also coupled to the input device 1750 (e.g., keypad, touchscreen, buttons etc.) and the display 1755. A user of the UE 200 can typically employ the input device to enter data into the UE. For example, the display can be a liquid crystal display or other display capable of rendering text and/or graphics, video, etc., from web sites, applications and/or service providers.

The memory 1760 is coupled to the processor 1740. Part of the memory may include a random access memory (RAM), and another part of the memory may include a Flash memory or other read-only memory (ROM).

As described in more detail below, the UE 200 can perform signaling and calculation for channel state information (CSI) reporting. Although FIG. 17 shows one illustrative example of UE 200, it may be appreciated that various changes may be made to the drawing. For example, various components may be combined, further subdivided, or omitted and additional components may be added according to particular needs. As a particular example, the processor 1740 may be divided into multiple processors, such as one or more central processing units (CPUs) and one or more graphics processing units (GPUs). Also, while FIG. 17 depicts the UE 200 as configured as a mobile device, such as a smartphone, UEs may be configured to operate as other types of portable or stationary devices.

Figure 18:
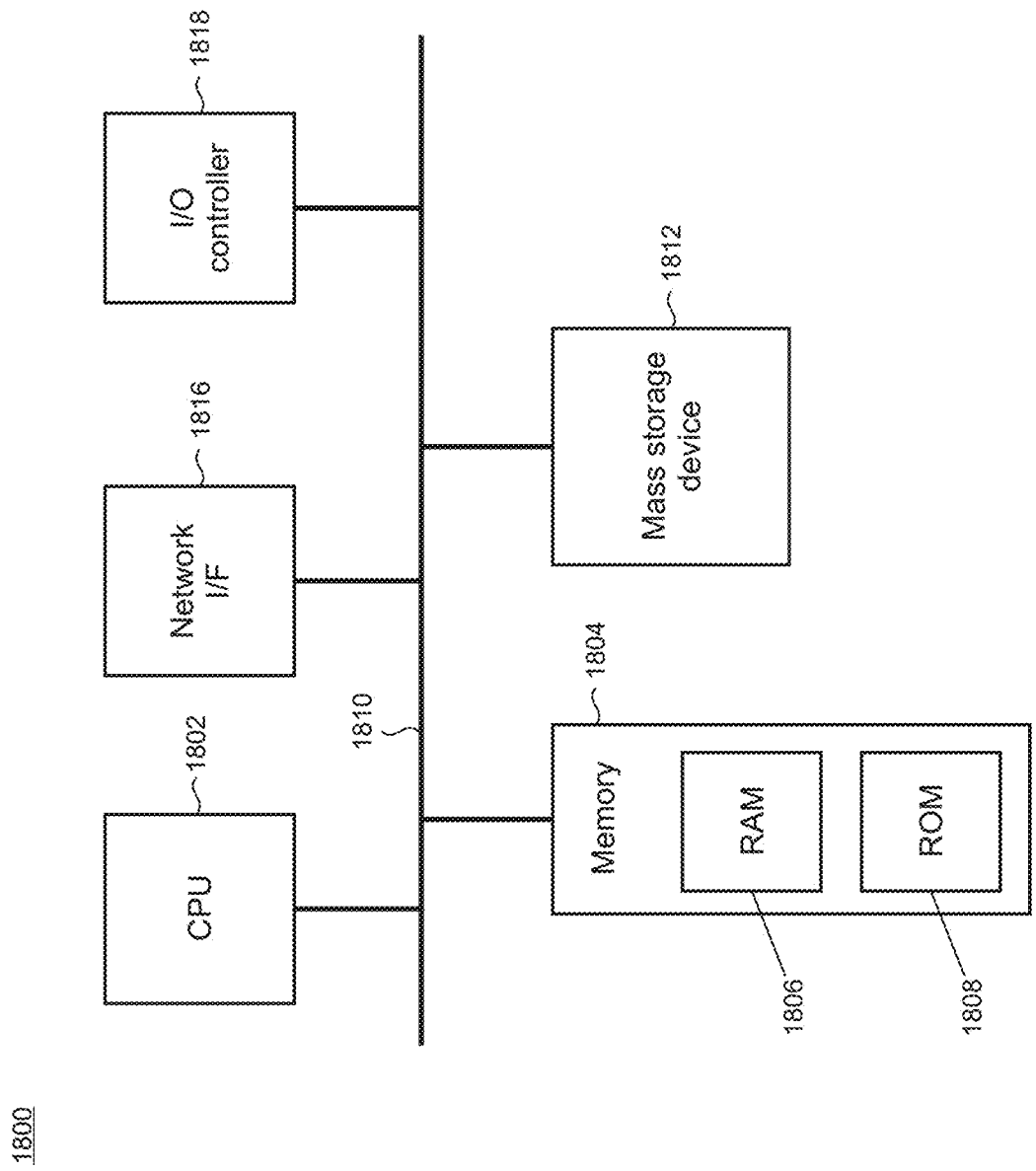
FIG. 18 is a block diagram of an illustrative server or computing device that may be used at least in part to implement the present automated matching of applications to pre-defined slice types in 5G networks.

FIG. 18 shows an illustrative architecture 1800 for a computing device, such as a server, capable of executing the various components described herein for automated matching of applications to pre-defined slice types in 5G networks. The architecture 1800 illustrated in FIG. 18 includes one or more processors 1802 (e.g., central processing unit, dedicated AI chip, graphics processing unit, etc.), a system memory 1804, including RAM (random access memory) 1806 and ROM (read only memory) 1808, and a system bus 1810 that operatively and functionally couples the components in the architecture 1800. A basic input/output system containing the basic routines that help to transfer information between elements within the architecture 1800, such as during startup, is typically stored in the ROM 1808. The architecture 1800 further includes a mass storage device 1812 for storing software code or other computer-executed code that is utilized to implement applications, the file system, and the operating system. The mass storage device 1812 is connected to the processor 1802 through a mass storage controller (not shown) connected to the bus 1810. The mass storage device 1812 and its associated computer-readable storage media provide non-volatile storage for the architecture 1800. Although the description of computer-readable storage media contained herein refers to a mass storage device, such as a hard disk or CD-ROM drive, it may be appreciated by those skilled in the art that computer-readable storage media can be any available storage media that can be accessed by the architecture 1800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, touchpad, touchscreen, control devices such as buttons and switches or electronic stylus (not shown in FIG. 18). Similarly, the input/output controller 1818 may provide output to a display screen, user interface, a printer, or other type of output device (also not shown in FIG. 18).

It may be appreciated that the software components described herein may, when loaded into the processor 1802 and executed, transform the processor 1802 and the overall architecture 1800 from a general-purpose computing system into a special-purpose computing system customized to facilitate the functionality presented herein. The processor 1802 may be constructed from any number of transistors or other discrete circuit elements, which may individually or collectively assume any number of states. More specifically, the processor 1802 may operate as a finite-state machine, in response to executable instructions contained within the software modules disclosed herein. These computer-executable instructions may transform the processor 1802 by specifying how the processor 1802 transitions between states, thereby transforming the transistors or other discrete hardware elements constituting the processor 1802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1800 in order to store and execute the software components presented herein. It also may be appreciated that the architecture 1800 may include other types of computing devices, including wearable devices, handheld computers, embedded computer systems, smartphones, PDAs, and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Figure 19:
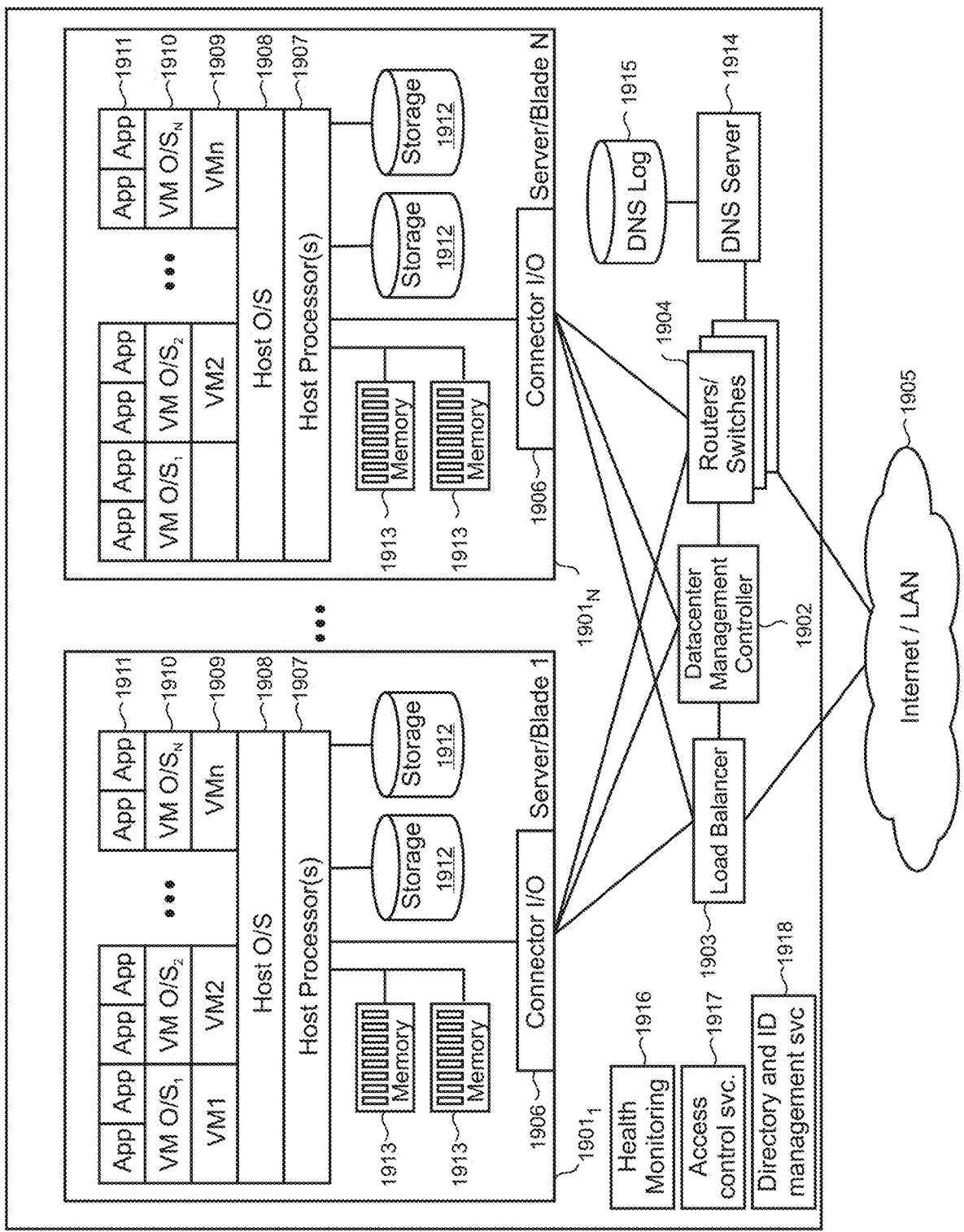
FIG. 19 is a block diagram of an illustrative datacenter that may be used at least in part to implement the present automated matching of applications to pre-defined slice types in 5G networks.

FIG. 19 is a high-level block diagram of an illustrative datacenter 1900 that provides cloud computing services or distributed computing services that may be used to implement the present automated matching of applications to pre-defined slice types in 5G networks. Datacenter 1900 may incorporate one or more of the features disclosed in the DCs shown in the drawings and described in the accompanying text. A plurality of servers 1901 are managed by datacenter management controller 1902. Load balancer 1903 distributes requests and computing workloads over servers 1901 to avoid a situation wherein a single server may become overwhelmed. Load balancer 1903 maximizes available capacity and performance of the resources in datacenter 1900. Routers/switches 1904 support data traffic between servers 1901 and between datacenter 1900 and external resources and users (not shown) via an external network 1905, which may be, for example, a local area network (LAN) or the Internet.

Servers 1901 may be standalone computing devices, and/or they may be configured as individual blades in a rack of one or more server devices. Servers 1901 have an input/output (I/O) connector 1906 that manages communication with other database entities. One or more host processors 1907 on each server 1901 run a host operating system (O/S) 1908 that supports multiple virtual machines (VM) 1909. Each VM 1909 may run its own O/S so that each VM O/S 1910 on a server is different, or the same, or a mix of both. The VM O/Ss 1910 may be, for example, different versions of the same O/S (e.g., different VMs running different current and legacy versions of the Windows® operating system). In addition, or alternatively, the VM O/Ss 1910 may be provided by different manufacturers (e.g., some VMs running the Windows® operating system, while other VMs are running the Linux® operating system). Each VM 1909 may also run one or more applications (App) 1911. Each server 1901 also includes storage 1912 (e.g., hard disk drives (HDD)) and memory 1913 (e.g., RAM) that can be accessed and used by the host processors 1907 and VMs 1909 for storing software code, data, etc. In one embodiment, a VM 1909 may employ the data plane APIs as disclosed herein.

Datacenter 1900 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1900 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 1909 on server 19011 to run their applications 1911. When demand for an application 1911 increases, the datacenter 1900 may activate additional VMs 1909 on the same server 19011 and/or on a new server 1901N as needed. These additional VMs 1909 can be deactivated if demand for the application later drops.

Datacenter 1900 may offer guaranteed availability, disaster recovery, and back-up services. For example, the datacenter may designate one VM 1909 on server 19011 as the primary location for the tenant's application and may activate a second VM 1909 on the same or a different server as a standby or back-up in case the first VM or server 19011 fails. The datacenter management controller 1902 automatically shifts incoming user requests from the primary VM to the back-up VM without requiring tenant intervention. Although datacenter 1900 is illustrated as a single location, it will be understood that servers 1901 may be distributed to multiple locations across the globe to provide additional redundancy and disaster recovery capabilities. Additionally, datacenter 1900 may be an on-premises, private system that provides services to a single enterprise user or may be a publicly accessible, distributed system that provides services to multiple, unrelated customers and tenants or may be a combination of both.

Domain Name System (DNS) server 1914 resolves domain and host names into IP addresses for all roles, applications, and services in datacenter 1900. DNS log 1915 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 1916 monitors the health of the physical systems, software, and environment in datacenter 1900. Health monitoring 1916 provides feedback to datacenter managers when problems are detected with servers, blades, processors, or applications in datacenter 1900 or when network bandwidth or communications issues arise.

Access control service 1917 determines whether users are allowed to access particular connections and services provided at the datacenter 1900. Directory and identity management service 1918 authenticates user credentials for tenants on datacenter 1900.

Figure 20:
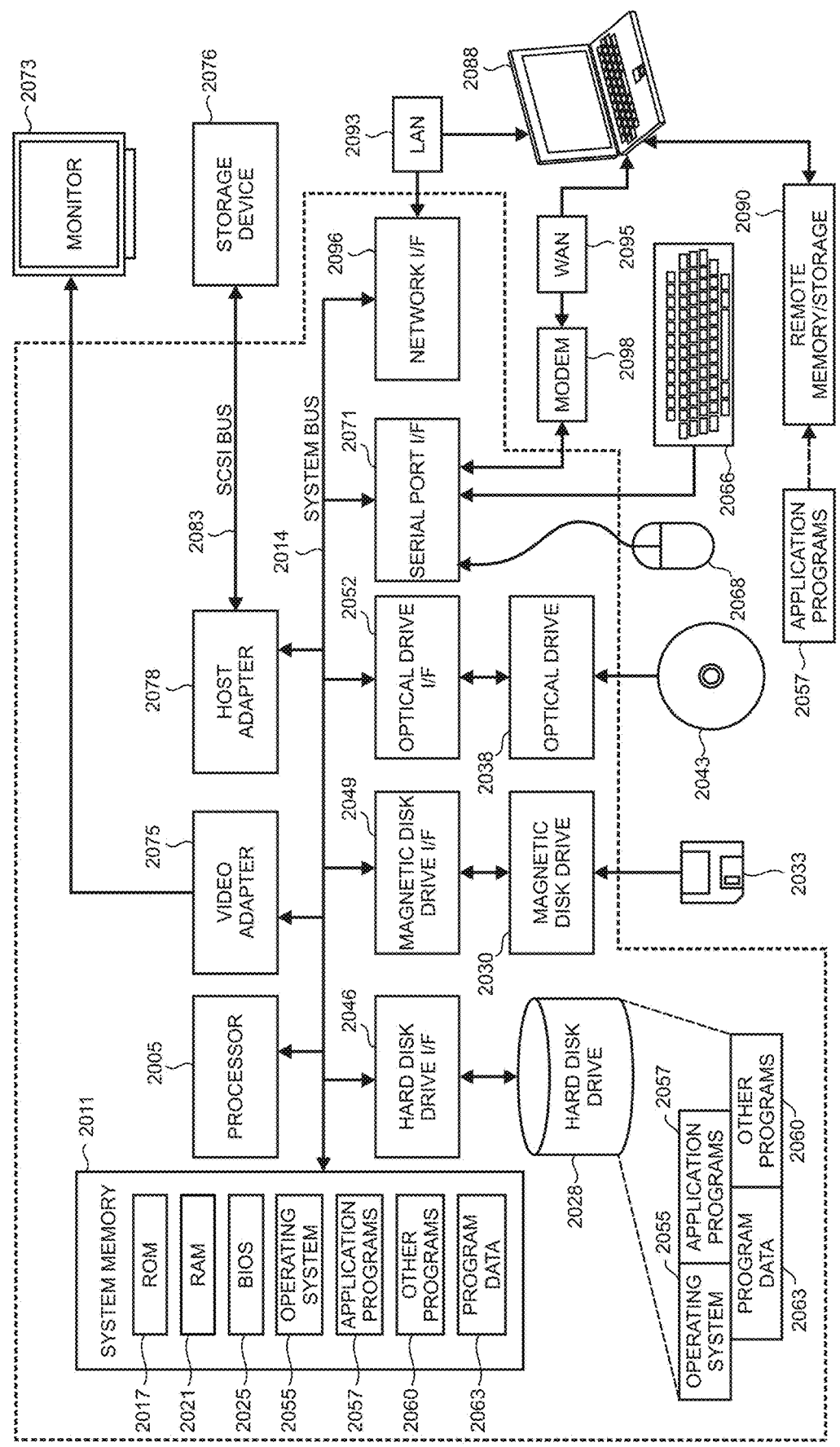
FIG. 20 is a simplified block diagram of an illustrative computer system that may be used at least in part to implement the present automated matching of applications to pre-defined slice types in 5G networks.

FIG. 20 is a simplified block diagram of an illustrative computer system 2000 such as a PC, client machine, or server with which the present automated matching of applications to pre-defined slice types in 5G networks. Computer system 2000 includes a processor 2005, a system memory 2011, and a system bus 2014 that couples various system components including the system memory 2011 to the processor 2005. The system bus 2014 may be any of several types of bus structures including a memory bus or memory controller, a peripheral bus, or a local bus using any of a variety of bus architectures. The system memory 2011 includes read only memory (ROM) 2017 and random access memory (RAM) 2021. A basic input/output system (BIOS) 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer-readable storage media provide non-volatile storage of computer-readable instructions, data structures, program modules, and other data for the computer system 2000. Although this illustrative example includes a hard disk, a removable magnetic disk 2033, and a removable optical disk 2043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present automated matching of applications to pre-defined slice types in 5G networks. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2005 through a serial port interface 2071 that is coupled to the system bus 2014, but may be connected by other interfaces, such as a parallel port, game port, or universal serial bus (USB). A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface (SCSI) bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network (LAN) 2093 and a wide area network (WAN) 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative and other means of establishing a communications link between the computers may be used depending on the specific requirements of an application of the present automated matching of applications to pre-defined slice types in 5G networks.

Various exemplary embodiments of the present automated matching of applications to pre-defined slice types in 5G networks are now presented by way of illustration and not as an exhaustive list of all embodiments. An example includes a computer-implemented method for matching applications to different pre-defined slice types in a 5G (fifth generation) network, comprising: providing a profile for each pre-defined slice type by measuring performance of slices of each type in carrying data aggregated from a plurality of applications executing on a respective plurality of user equipment (UE); receiving a request to access the 5G network from an application that is executing on the UE; responsive to the access request, providing temporary access to the application on the 5G network; providing a profile for the application by measuring performance of the 5G network in carrying application data; comparing the application profile to each of the slice type profiles to identify a closest match; and providing ongoing access to the application on a slice with a slice type profile having the identified closest match to the application profile.

In another example, the measuring of performance of slices of each type in carrying the aggregated data is performed over one or more pre-defined time intervals. In another example, the measuring of the performance of the 5G network in carrying application data is performed over one or more pre-defined time intervals. In another example, the performance is measured using metrics comprising one or more of availability, throughput, latency, bit/packet error rate, or energy. In another example, the performance measuring is based on a portion of the 5G network including one or more of RAN (radio access network), mobile core, or cloud, or the performance measuring is performed end-to-end. In another example, the computer-implemented method further includes periodically updating the slice type profiles and application profile responsively to changed 5G network conditions. In another example, the computer-implemented method further includes providing the temporary access responsive to the application failing to identify a pre-defined slice type. In another example, service for the temporary access is provided on one of a best effort basis or no guarantee basis.

A further example includes one or more hardware-based non-transitory computer-readable memory devices storing computer-executable instructions which, upon execution by one or more processors disposed in a computing device, cause the computing device to: provide a monitoring functionality to each of a plurality of slices in a 5G (fifth generation) network, each slice being of a different type, each monitoring functionality providing observations of behaviors of a respective slice in carrying data over the 5G network; use the observed slice behaviors to generate a unique profile for each slice type respectively associated with the plurality of slices; receive a request from an application executing on user equipment (UE) to access the 5G network, in which the request does not identify a slice type; permit the application to temporarily utilize a selected slice from the plurality of slices to carry application data over the 5G network in response to the request; observe behavior of the application while temporarily utilizing the selected slice to carry application data over the 5G network; use the observed application behavior to generate an application profile; and identify a profile of a slice type that most closely matches the application profile relative to other slice type profiles.

In another example, the computer-executable instructions, when executed, further cause the computing device to switch the application from the temporarily-utilized selected slice to utilizing a slice of the type with the identified profile to carry application data over the 5G network. In another example, each slice type is associated with a pre-defined service provided on the 5G network. In another example, the request does not identify a slice type because the application is unaware of the slice type. In another example, the slice type profiles are defined by one or more of throughput, latency, or reliability over some predetermined time interval.

A further example includes a computing device, comprising: at least one processor; and at least one hardware-based non-transitory computer-readable storage device having computer-executable instructions stored thereon which, when executed by the at least one processor, cause the computing device to observe one or more of throughput, latency, or reliability of data traffic on each of a plurality of slices in a 5G (fifth generation) network in which each slice has a different slice type; create profiles for each of the different slice types using the observations of data traffic on each of the plurality of slices; observe one or more of throughput, latency, or reliability of data traffic from an application using a selected slice among the plurality of slices in the 5G network; create a profile for the application using the observations of the application data traffic on the selected slice; and switch application data traffic from the selected slice to a slice having the slice type profile that most closely matches the application profile relative to other slice type profiles.

In another example, the computer-executable instructions, when executed by the least one processor, further cause the computing device to store the slice type profiles in a data store. In another example, the computer-executable instructions, when executed by the least one processor, further cause the computing device to update the stored slice type profiles periodically in view of new observations of throughput and reliability of data transmissions. In another example, each slice type is identified by a unique SST (Slice/Services Type) value defined by 3GPP (3rd Generation Partnership Project). In another example, the computer-executable instructions, when executed by the least one processor, further cause the computing device to determine data traffic demand by the application and in which the created application profile is based, at least in part, on the determined data traffic demand. In another example, each slice type is associated with a unique 5G network service offering. In another example, each slice type is associated with a respective service level agreement (SLA) among a plurality of SLAs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method performed by a controller disposed in a radio access network (RAN) for matching applications to different pre-defined slice types in a 5G (fifth generation) network, the computer-implemented method comprising:
   generating a slice profile for each pre-defined slice type by measuring performance of slices of each type in carrying data aggregated from a plurality of applications executing on a respective plurality of user equipment (UE);

receiving a request to access the 5G network from an application that is executing on the UE;

responsive to the access request, providing access to the application to a temporary slice of the 5G network;

a generating an application profile for the application by measuring performance of the temporary slice in carrying data from the application over the 5G network;

comparing the application profile to each of the slice typo profiles to identify a closest match; and switching the application access to the 5G network from the temporary slice to a slice with a slice profile having the identified closest match to the application profile.

2. The computer-implemented method of claim 1 in which the measuring of performance of slices of each type in carrying the aggregated data is performed over one or more pre-defined time intervals.

3. The computer-implemented method of claim 1 in which the measuring of the performance of the 5G network in carrying application data is performed over one or more pre-defined time intervals.

4. The computer-implemented method of claim 1 in which the performance is measured using metrics comprising one or more of availability, throughput, latency, bit/packet error rate, or energy.

5. The computer-implemented method of claim 1 in which the performance measuring is based on a portion of the 5G network including one or more of RAN (radio access network), mobile core, or cloud, or the performance measuring is performed end-to-end.

6. The computer-implemented method of claim 1 further including periodically updating the slice type profiles and application profile responsively to changed 5G network conditions.

7. The computer-implemented method of claim 1 further including providing the access to the temporary slice responsive to the application failing to identify a pre-defined slice type.

8. The computer-implemented method of claim 1 in which service for the access to the temporary slice is provided on one of a best effort basis or no guarantee basis.

9. One or more hardware-based non-transitory computer-readable memory devices storing computer-executable instructions which, upon execution by one or more processors disposed in a computing device disposed in a radio access network (RAN), cause the computing device to:

provide a monitoring functionality to each of a plurality of slices in a 5G (fifth generation) network, each slice being of a different pre-defined type, each monitoring functionality providing observations of behaviors of a respective slice in carrying data over the 5G network;

use the observed slice behaviors to generate a unique slice profile for each slice type respectively associated with the plurality of slices;

receive a request from an application executing on user equipment (UE) to access the 5G network, in which the request does not identify a slice type;

permit the application to access a temporary slice from the plurality of slices to carry data from the application over the 5G network in response to the request;

observe behavior of the application as the slice carries data from the application over the 5G network;

use the observed application behavior to generate an application profile; and identify a slice profile of a slice type that most closely matches the application profile relative to slice profiles of other slice types.

10. The one or more hardware-based non-transitory computer-readable memory devices of claim 9 in which the computer-executable instructions, when executed, further cause the computing device to switch the application from the temporary slice to utilizing a slice of the type with the identified profile to carry application data over the 5G network.

11. The one or more hardware-based non-transitory computer-readable memory devices of claim 9 in which each slice type is associated with a pre-defined service provided on the 5G network.

12. The one or more hardware-based non-transitory computer-readable memory devices of claim 9 in which the request does not identify a slice type because the application is unaware of the slice type.

13. The one or more hardware-based non-transitory computer-readable memory devices of claim 9 in which the slice type profiles are defined by one or more of throughput, latency, or reliability over some predetermined time interval.

14. A computing device operable in a radio access network (RAN), comprising:

at least one processor; and at least one hardware-based non-transitory computer-readable storage device having computer-executable instructions stored thereon which, when executed by the at least one processor, cause the computing device to:

observe one or more of throughput, latency, or reliability of data traffic on each of a plurality of slices in a 5G (fifth generation) network in which each slice has a different slice type;

generate a slice profile for each slice of the plurality of slices of the different slice types using the observations of data traffic on each slice of the plurality of slices;

observe one or more of throughput, latency, or reliability of data traffic from an application accessing a temporary slice among the plurality of slices in the 5G network;

a generate an application profile for the application using the observations of the data from the application carried on the selected temporary slice; and switch application data traffic from the temporary slice to a slice having the slice profile that most closely matches the application profile relative to other slice profiles.

15. The computing device of claim 14 in which the computer-executable instructions, when executed by the least one processor, further cause the computing device to store the slice profiles in a data store.

16. The computing device of claim 15 in which the computer-executable instructions, when executed by the least one processor, further cause the computing device to update the stored slice profiles periodically in view of new observations of throughput and reliability of data transmissions.

17. The computing device of claim 14 in which each slice type is identified by a unique SST (Slice/Services Type) value defined by 3GPP (3rd Generation Partnership Project).

18. The computing device of claim 14 in which the computer-executable instructions, when executed by the least one processor, further cause the computing device to determine data traffic demand by the application and in which the created application profile is based, at least in part, on the determined data traffic demand.

19. The computing device of claim 14 in which each slice type is associated with a unique 5G network service offering.

20. The computing device of claim 14 in which each slice type is associated with a respective service level agreement (SLA) among a plurality of SLAs.

\* \* \* \* \*